(12) United States Patent
Chafekar

(10) Patent No.: US 11,143,627 B2
(45) Date of Patent: Oct. 12, 2021

(54) STACKED OPTICAL FILTER ARRANGEMENT FOR A PHOTOACOUSTIC SPECTROMETRY DEVICE FOR MULTI-GAS SENSING AND PHOTOACOUSTIC SPECTROMETRY DEVICE

(71) Applicant: Infineon Technologies AG, Neubiberg (DE)

(72) Inventor: Saumitra Sanjeev Chafekar, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 142 days.

(21) Appl. No.: 16/580,600

(22) Filed: Sep. 24, 2019

(65) Prior Publication Data

US 2020/0150096 A1   May 14, 2020

(30) Foreign Application Priority Data

Nov. 12, 2018   (EP) .................................... 18205783

(51) Int. Cl.
   *G01N 29/24*     (2006.01)
   *G02F 1/1335*    (2006.01)
   (Continued)

(52) U.S. Cl.
   CPC ..... *G01N 29/2425* (2013.01); *G02F 1/13439* (2013.01); *G02F 1/133509* (2013.01);
   (Continued)

(58) Field of Classification Search
   CPC ......... G01N 29/2425; G01N 2291/021; G01N 21/255; G01N 21/1702; G01N 2021/1704;
   (Continued)

(56) References Cited

U.S. PATENT DOCUMENTS 5,076,669 A      12/1991   Black et al.
5,546,209 A *    8/1996    Willner .................... G02B 6/43
                                                     250/551

(Continued)

FOREIGN PATENT DOCUMENTS

DE    102017129454 A1    6/2018
WO    2018054094 A1      3/2018

*Primary Examiner* — Suman K Nath
(74) *Attorney, Agent, or Firm* — Slater Matsil, LLP

(57) ABSTRACT

A stacked optical filter arrangement includes a pneumatic liquid crystal layer stacked between a first and second transparent electrode layers, wherein the first transparent electrode layer includes electrode segments that are isolated from each other; first and second polarizer layers, wherein the pneumatic liquid crystal layer is stacked between the first polarizer layer and the second polarizer layer; a filter layer including filter segments, wherein at least two of the filter segments are wavelength sensitive filter segments, wherein at least two of the wavelength sensitive filter segments are transparent for different wavelengths; and optical channels, wherein each optical channel includes a portion of the pneumatic liquid crystal layer, a portion of the first electrode layer, one of the plurality of electrode segments of the second transparent electrode layer, a portion of the first polarizer layer, a portion of the second polarizer layer, and one of the plurality of filter segments.

16 Claims, 15 Drawing Sheets

(51) Int. Cl.
*G02F 1/1343* (2006.01)
*G01N 21/17* (2006.01)
*G01N 21/25* (2006.01)

(52) U.S. Cl.
CPC .. *G02F 1/133526* (2013.01); *G02F 1/133528* (2013.01); *G01N 21/1702* (2013.01); *G01N 21/255* (2013.01); *G01N 2021/1704* (2013.01); *G01N 2291/021* (2013.01)

(58) Field of Classification Search
CPC ......... G02F 1/133509; G02F 1/133526; G02F 1/133528; G02F 1/13439; G02F 1/134309; G02F 1/133514; G02B 27/30; G02B 5/201; G02B 3/08
See application file for complete search history.

(56) References Cited

U.S. PATENT DOCUMENTS

2012/0167693 A1  7/2012  Asao
2016/0300535 A1* 10/2016  Gilbert .............. G02F 1/133526

* cited by examiner

STACKED OPTICAL FILTER ARRANGEMENT FOR A PHOTOACOUSTIC SPECTROMETRY DEVICE FOR MULTI-GAS SENSING AND PHOTOACOUSTIC SPECTROMETRY DEVICE

This application claims the benefit of European Application No. 18205783.6, filed on Nov. 12, 2018, which application is hereby incorporated herein by reference.

TECHNICAL FIELD

Embodiments relate to photo acoustic spectrometry for multi-gas sensing, particularly to a novel optical filter to sense/detect/measure multiple gases based on photo acoustic spectrometry.

BACKGROUND

Photoacoustic spectroscopy (PAS) is the measurement of the effect of absorbed electromagnetic energy, particularly of light on matter by means of acoustic detection. It is a widely used method for measuring accurately the concentrations of various gases due to its ability to evaluate subject sample in its in-situ state.

Photoacoustic spectroscopy is most popular for the gases that exhibit receptivity for infrared radiations due to following facts:

1) Molecules can absorb and emit energy only at certain wavelengths.

2) The typical infrared wavelength of interest is considerably high to that of the size of a molecule of a gas to be detected. For example, infrared wavelength required for detection of carbon dioxide, is 400 times greater than the size of $CO_2$ molecule, where interaction between infrared light and gas molecules happens via electric field with molecule's electric charge distribution.

3) Excited molecular states have very long lifetimes compared to excited electron states, from milliseconds to tenths of seconds. This helps in easy and prominent detection.

4) Mean time between collisions with another molecule is roughly 0.1 microseconds; so many collisions and efficient energy transfer further enhance the detectability.

5) Very little scattering occurs, leading to more robust and viable for detection solution. This also enhances the accuracy of measurement.

In order to produce light having a specific wavelength usually a broadband radiator and a tunable wavelength sensitive optical filter are used. State of the art examples of tunable optical filters either by means of electrical, electro-mechanical or a combination of both technologies are: Quartz based tunable filter, mechanical rotating wheel-filters, MEMS based solutions, Fabry-Perot Interferometer (FPI) based filters and liquid crystal tunable filters (LCTFs).

SUMMARY

In a first aspect embodiments of the disclosure relate to a stacked optical filter arrangement for a photoacoustic spectrometry device for multi-gas sensing. The stacked optical filter arrangement comprises:

a pneumatic liquid crystal layer stacked between a first transparent electrode layer and a second transparent electrode layer, wherein the first transparent electrode layer comprises a plurality of electrode segments which are electrically isolated from each other;

a first polarizer layer and a second polarizer layer, wherein the pneumatic liquid crystal layer is stacked between the first polarizer layer and the second polarizer layer;

a filter layer being configured for filtering light, wherein the filter layer comprises a plurality of filter segments, wherein at least two of the filter segments are wavelength sensitive filter segments, wherein at least two of the wavelength sensitive filter segments are transparent for different wavelengths; and a plurality of optical channels, wherein each optical channel of the plurality of optical channels comprises a portion of the pneumatic liquid crystal layer, a portion of the first electrode layer, one of the plurality of electrode segments of the second transparent electrode layer, a portion of the first polarizer layer, a portion of the second polarizer layer and one of the plurality of filter segments;

wherein each optical channel of the plurality of optical channels can be activated independently from the other optical channels of the plurality of optical channels by applying a first voltage between the first transparent electrode layer and the electrode segment of the second transparent electrode layer of the respective optical channel; and wherein each optical channel of the plurality of optical channels can be deactivated independently from the other optical channels of the plurality of optical channels by applying a second voltage between the first transparent electrode layer and the electrode segment of the second transparent electrode layer of the respective optical channel.

A stacked optical filter arrangement is an arrangement, which comprises a plurality of layers, which are arranged substantially parallel with respect to each other.

A pneumatic liquid crystal layer is a layer, which comprises liquid crystal molecules in a pneumatic phase. Liquid crystals (LCs) are matter in a state which has properties between those of conventional liquids and those of solid crystals. For instance, a liquid crystal may flow like a liquid, but its molecules may be oriented in a crystal-like way. There are many different types of liquid-crystal phases, which can be distinguished by their different optical properties (such as birefringence). The optical filter described herein uses liquid crystals in the pneumatic phase. In this phase liquid crystal molecules are rod shaped and have no positional order. However, they self-align to have long-range directional order with their long axes roughly parallel. Mostly uniaxial molecules of liquid crystals in this phase, exhibit fluidity similar to that of ordinary (isotropic) liquids but they can be easily aligned by an external magnetic or electric field. Aligned pneumatic liquid crystals have the optical properties of uniaxial crystals.

Hence, the pneumatic liquid crystals that are composed of rod-like molecules having the long axes of neighboring molecules aligned approximately to one another. To describe this anisotropic structure, a dimensionless unit vector called the director, is introduced to represent the direction of preferred orientation of molecules about any point. Such director hence represents the overall orientation of an optical axis governed by all aligned molecules.

The ability of the director to align along an external field is caused by the electric nature of the molecules. Permanent electric dipoles result when one end of a molecule has a net positive charge while the other end has a net negative charge. When an external electric field is applied to the liquid crystal, the dipole molecules tend to orient themselves along the direction of the field.

Even if a molecule does not form a permanent dipole, it can still be influenced by an electric field. In some cases, the field produces slight rearrangement of electrons and protons in molecules such that an induced electric dipole results. While not as strong as permanent dipoles, orientation with the external field still occurs.

The first transparent electrode layer and the second transparent electrode layer are arranged in such way that each portion of the pneumatic liquid crystal layer, which is arranged between the first transparent electrode layer and one of the electrode segments of the second transparent electrode layer, may be individually exposed to an electrical field. The electrode segments usually are arranged coplanar so that they comprise a common plane.

A polarizer is an optical filter that lets light waves of a specific polarization pass through while blocking light waves of other polarizations. It can convert a beam of light of undefined or mixed polarization into a beam of well-defined polarization that is polarized light. This is done by means of discarding/filtering light waves that are not in alignment with the axis of polarization of said polarizer. Each of the first polarizer layer and the second polarizer layer may comprise a linear polarizer.

The filter layer comprises two or more wavelength sensitive filter segments, wherein each of the wavelength sensitive filter segment is transparent for defined wavelength and non-transparent for other wavelengths. At least two of the wavelength sensitive filter segments are transparent for different wavelengths. The filter segments usually are arranged coplanar so that they comprise a common plane.

An optical channel of the stacked optical filter arrangement is a path from an input side to an output side of the stacked optical filter arrangement, which individually can be either activated or deactivated. If one of the optical channels is in an activated state, incident light having an appropriate wavelength will pass the respective optical channel so that filtered light will exit the stacked optical filter arrangement. In contrast to that, if one of the optical channels is in a deactivated state, incident light will be blocked independently from the wavelength in the respective optical channel so that no light will exit the stacked particular filter arrangement.

Each optical channel of the plurality of optical channels can be activated independently from the other optical channels of the plurality of optical channels by applying a first voltage between the first transparent electrode layer and the electrode segment of the second transparent electrode layer of the respective optical channel.

Each optical channel of the plurality of optical channels can be deactivated independently from the other optical channels of the plurality of optical channels by applying a second voltage between the first transparent electrode layer and the electrode segment of the second transparent electrode layer of the respective optical channel.

As a result, the stacked optical filter arrangement may be tuned by applying the first voltage to that optical channel which comprises the wavelength sensitive filter segment which is transparent for the desired wavelength and by a applying the second voltage to the other optical channels.

The stacked optical filter arrangement disclosed herein provides a high selectivity, the high efficiency, a high transmissivity and a wide range of tuning. No drift in selectivity over period of operation will occur. It does not have any moving mechanical parts so that it is easy to maintain and robust against destruction. Moreover, the disclosed construction allows miniaturization.

The stacked optical filter arrangement is suitable especially for a photoacoustic spectrometry device for multi-gas sensing, which, in particular, may be used for environmental sensing and air quality monitoring systems.

According to embodiments of the disclosure the first transparent electrode layer comprises a glass layer having a conductive coating. Such features increase the selectivity, the efficiency, the transmissivity, the robustness and compactness of the arrangement.

According to embodiments of the disclosure the second transparent electrode layer comprises a glass layer having a conductive coating, wherein the conductive coating is structured in order to form the plurality of electrode segments of the second transparent electrode layer. Such features further increase the selectivity, the efficiency, the transmissivity, the robustness and compactness of the arrangement.

According to embodiments of the disclosure the filter layer is arranged at an end of the stacked optical filter arrangement. In particular the filter layer may be arranged at an end which is arranged at the input side of the filter arrangement. This may lead to a further increase of efficiency, selectivity and transmissivity.

According to embodiments of the disclosure within each optical channel of the plurality of optical channels a polarizing axis of the portion of the first polarizer layer of the respective optical channel is orientated perpendicular to a polarizing axis of the portion of the second polarizer layer of the respective optical channel.

The first voltage, for example, may be 12 V, whereas the second voltage may be in the range of 0 V. In this case electric energy is only needed for that optical channel which is activated so that the efficiency may be further increased.

According to embodiments of the disclosure within each optical channel of the plurality of optical channels a polarizing axis of the portion of the first polarizer layer of the respective optical channel is orientated parallel to a polarizing axis of the portion of the second polarizer layer of the respective optical channel.

The first voltage, for example, may be 0 V, whereas the second voltage may be in the range of 12 V. In this case electric energy is only needed for that optical channels which are deactivated so that the efficiency may be increased compared to constructions in which both voltages are different from zero.

According to embodiments of the disclosure the stacked optical filter arrangement comprises a collimation arrangement for parallelizing the light, wherein each optical channel of the plurality of optical channels comprises a portion of the collimation arrangement.

According to embodiments of the disclosure the collimation arrangement comprises a Fresnel lens.

Such features further increase the selectivity, the efficiency, the transmissivity, the robustness and compactness of the arrangement.

According to embodiments of the disclosure at least one of the filter segments is a wavelength insensitive filter segment, which is transparent at least for wavelengths between 3 μm and 5 μm. Such features allow the calibration of a photoacoustic spectrometry device in which the filter arrangement is used.

In a further aspect embodiments of the disclosure relate to a photoacoustic spectrometry device for multi-gas sensing. The photoacoustic spectrometry device comprises:

a radiator configured for emitting light, which is coherent;

a stacked optical filter arrangement according to one of the preceding claims, wherein the stacked optical filter arrangement is configured for receiving and filtering the light from the radiator in order to produce filtered light;

a gas detection chamber configured for exposing a mixture of gases to the filtered light;

a microphone configured for detecting sound in the gas detection chamber, which is caused by exposing the mixture of gases to the filtered light; and a control device configured for controlling the photoacoustic spectrometry device.

The radiator may be configured for emitting light in the infrared, the ultraviolet or the visible range. However, it is preferred that the radiator is configured for emitting light in the mid-infrared range. Light is coherent if it has temporarily and spatially a constant phase and a constant frequency.

The filtered light is guided into the gas detection chamber where it interacts with a mixture of gases so that a sound pressure is generated according to the photo acoustic spectrometry principle if the mixture of gases contains a gas which can absorb the filtered light, wherein the sound pressure is proportional to the concentration of such gas. In principle, the sound can be in the infrasound range or the acoustic sound range or in the ultrasound range, wherein the frequency of sound depends on the switching frequency at which the respective optical channel is repeatedly switched from the activated state to the deactivated state and backwards.

The microphone is configured to record the sound at the desired frequency range.

The control device in particular may be configured to control the radiator, the first and the second voltages, which are applied to the stacked optical filter arrangement in order to activate and deactivate the optical channels, and to analyze the signals from the microphone.

The stacked optical filter arrangement is configured according to the disclosure herein and possesses the advantages as described.

The described photoacoustic spectrometry device benefits from the stacked optical filter arrangement and its advantages.

According to embodiments of the disclosure the radiator is arranged on a first side of the filter layer of the stacked optical filter arrangement, and wherein the first polarizer layer and the second polarizer are arranged on a second side of the filter layer of the stacked optical filter arrangement.

Such features further increase the selectivity, the efficiency, the transmissivity, the robustness and compactness of the arrangement.

According to embodiments of the disclosure the radiator is configured for emitting a continuous spectrum comprising at least wavelengths between 3 μm and 5 μm. by these features it is possible to detect most common gases such as $CO_2$, $CO$, $CH_4$ and $NO_2$, which contribute mostly to environmental pollution, provided that the stacked optical filter arrangement can be tuned to the corresponding wavelengths.

According to embodiments of the disclosure the control device is configured for controlling a measuring procedure, in which at a same time interval:

one optical channel of the plurality of optical channels, which comprises one of the wavelength sensitive filter segments, is alternately activated or deactivated at a switching frequency by alternately applying the first voltage or the second voltage between the first transparent electrode layer and the electrode segment of the second transparent electrode layer of the respective optical channel;

all other optical channels of the plurality of optical channels, which comprise a wavelength insensitive filter segment or one of the wavelength sensitive filter segments being transparent for a different wavelength than the wavelength sensitive filter segment of the one optical channel, are deactivated by applying the second voltage between first the transparent electrode layer and the electrode segment of the second transparent electrode layer of the respective optical channels; and the sound in the detection chamber is detected by using the microphone.

By these features it is ensured that a sound having the switching frequency and a characteristic shape is generated so that a gas, which is able to absorb the filtered light in the mixture of gases in the detection chamber may be detected, if a specific optical channel of the plurality of optical channels is selected. By selecting another optical channel of the plurality of optical channels for alternate activation and deactivation, the wavelength of the filtered light may be changed, so that another gas of the mixture of gases can be detected.

According to embodiments of the disclosure the control device is configured for controlling a calibrating procedure, in which at a same further time interval:

one optical channel of the plurality of optical channels, which comprises a wavelength insensitive filter segment, is alternately activated or deactivated at the switching frequency by alternately applying the first voltage or the second voltage between the first transparent electrode layer and the electrode segment of the second transparent electrode layer of the respective optical channel;

all other optical channels of the plurality of optical channels, which comprise a wavelength sensitive filter segment, are deactivated by applying the second voltage between the first transparent electrode layer and the electrode segment of the second transparent electrode layer of the respective optical channels; and the sound in the gas detection chamber is detected by using the microphone in order to estimate a decay of the radiator by measuring a strength of the sound.

Such a calibration procedure may enhance the measurement precision of the device. In particular, measurement errors caused by deterioration or a decay of the radiator may be avoided.

According to embodiments of the disclosure the switching frequency is in a range from 100 kHz to 300 kHz. By these features it is ensured that the frequency of the sound in the detection chamber is in the range which is, compared to other sound ranges, less polluted by other sound sources so that the signal-to-noise ratio may be increased.

According to embodiments of the disclosure a distance between the first transparent electrode layer and the second transparent electrode layer is smaller than a maximum distance between the first transparent electrode layer and the second transparent electrode layer, wherein the maximum distance is calculated according to a numerical value equation $d_{max}=T \times U$, wherein $d_{max}$ is the maximum distance in μm, wherein T is a time of oscillation of the switching frequency in μs and wherein U is an absolute value of a difference between the first voltage and the second voltage in V.

By these features it's ascertained that a sound at the desired frequency can be generated.

In the further aspect embodiments of the disclosure relate to a method for manufacturing a stacked optical filter arrangement for a photoacoustic spectrometry device for multi-gas sensing. The method comprises the steps:

arranging a pneumatic liquid crystal layer between a first transparent electrode layer and a second transparent electrode layer, wherein the second transparent electrode layer comprises a plurality of electrode segments which are electrically isolated from each other;

arranging the pneumatic liquid crystal layer between a first polarizer layer and a second polarizer layer;

adding a filter layer being configured for filtering light, wherein the filter layer comprises a plurality of filter segments, wherein at least two of the filter segments are wavelength sensitive filter segments, wherein at least two of the wavelength sensitive filter segments are transparent for different wavelengths; and forming a plurality of optical channels;

so that each optical channel of the plurality of optical channels comprises a portion of the pneumatic liquid crystal layer, a portion of the first electrode layer, one of the plurality of electrode segments of the second transparent electrode layer, a portion of the first polarizer layer, a portion of the second polarizer layer and one of the plurality of filter segments;

so that each optical channel of the plurality of optical channels can be activated independently from the other optical channels of the plurality of optical channels by applying a first voltage between the first transparent electrode layer and the electrode segment of the second transparent electrode layer of the respective optical channel; and so that each optical channel of the plurality of optical channels can be deactivated independently from the other optical channels of the plurality of optical channels by applying a second voltage between the first transparent electrode layer and the electrode segment of the second transparent electrode layer of the respective optical channel.

BRIEF DESCRIPTION OF THE DRAWINGS

Embodiments of the present invention are described herein making reference to the appended drawings.

Figure 1:
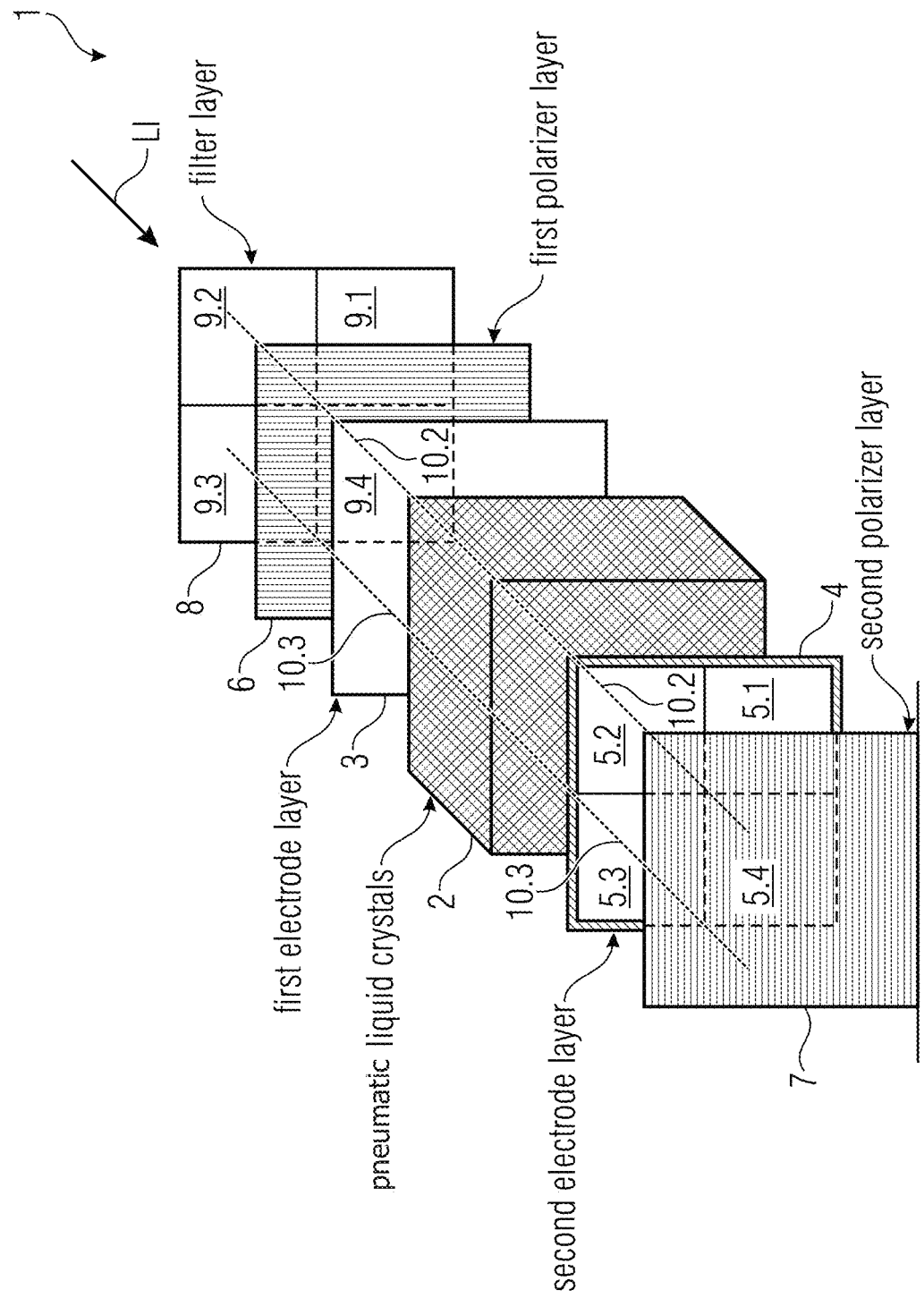
FIG. 1 shows a schematic, perspective, exploded view of a first embodiment of a stacked optical filter arrangement for a photoacoustic spectrometry device for multi-gas sensing.

Equal or equivalent elements or elements with equal or equivalent functionality are denoted in the following description by equal or equivalent reference numerals.

DETAILED DESCRIPTION OF ILLUSTRATIVE EMBODIMENTS

In the following description, a plurality of details is set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic, perspective, exploded view of a first embodiment of a stacked optical filter arrangement 1 for a photoacoustic spectrometry device for multi-gas sensing. The stacked optical filter arrangement 1 comprises:

a pneumatic liquid crystal layer 2 stacked between a first transparent electrode layer 3 and a second transparent electrode layer 4, wherein the second transparent electrode layer 4 comprises a plurality of electrode segments 5 which are electrically isolated from each other;

a first polarizer layer 6 and a second polarizer layer 7, wherein the pneumatic liquid crystal layer 2 is stacked between the first polarizer layer 6 and the second polarizer layer 7;

a filter layer 8 being configured for filtering light LI, wherein the filter layer 8 comprises a plurality of filter segments 9, wherein at least two of the filter segments 9 are wavelength sensitive filter segments 9, wherein at least two of the wavelength sensitive filter segments 9 are transparent for different wavelengths; and a plurality of optical channels 10, wherein each optical channel of the plurality of optical channels 10 comprises a portion of the pneumatic liquid crystal layer 2, a portion of the first electrode layer 3, one of the plurality of electrode segments 5 of the second transparent electrode layer 4, a portion of the first polarizer layer 6, a portion of the second polarizer layer 7 and one of the plurality of filter segments 9;

wherein each optical channel 10 of the plurality of optical channels 10 can be activated independently from the other optical channels 10 of the plurality of optical channels 10 by applying a first voltage FV between the first transparent electrode 3 layer and the electrode segment 5 of the second transparent electrode layer 4 of the respective optical channel 10; and wherein each optical channel 10 of the plurality of optical channels 10 can be deactivated independently from the other optical channels 10 of the plurality of optical channels 10 by applying a second voltage SV between the first transparent electrode layer 3 and the electrode segment 5 of the second transparent electrode layer 4 of the respective optical channel 10.

It has to be noted that the explosive view is for illustration only. In general neighboring layers of the stacked optical filter arrangement touch each other.

In the first embodiment of the stacked optical filter arrangement 1, the pneumatic crystal layer 2, first transparent electrode layer 3 and the second transparent electrode layer 4 are stacked between the first polarizer layer 6 and the second polarizer layer 7.

Following are the typical advantages of stacked optical filter arrangement 1 for multi-gas sensing in photoacoustic spectrometry:

1) no moving or mechanical parts making it extremely rugged and light weight;
2) highly scalable for portable and consumer applications;
3) low power solution as activated optical channel remains activated with only momentary application of switching voltage;
4) best or maximum selectivity due to in-situ usage of fixed wavelength optical filter sections;
5) extremely low losses due to excellent transmittance (over 95%) achieved by novel construction;
6) high transmissivity makes it suitable for both narrow band width and wide bandwidth applications;
7) can be extended for detection of any number of gases in their in-situ form;
8) extremely cost effective compared to state of art moving and mechanical solutions;
9) virtually no maintenance cost, and long life/endurance;
10) no calibration or fine tuning required during or after operation;
11) can be easily controlled by means of micro-processor/controller/software;
12) opaque to direct exposure to high temperature due to fixed-wavelength optical filters;
13) opaque to direct exposure to very low temperature due to uniform heating source provided by basic PAS device arrangement/assembly; and
14) easy recalibration of system during operation of device, as required due to steady decay of IR emitter/heater over operational lifetime.

Figure 2:
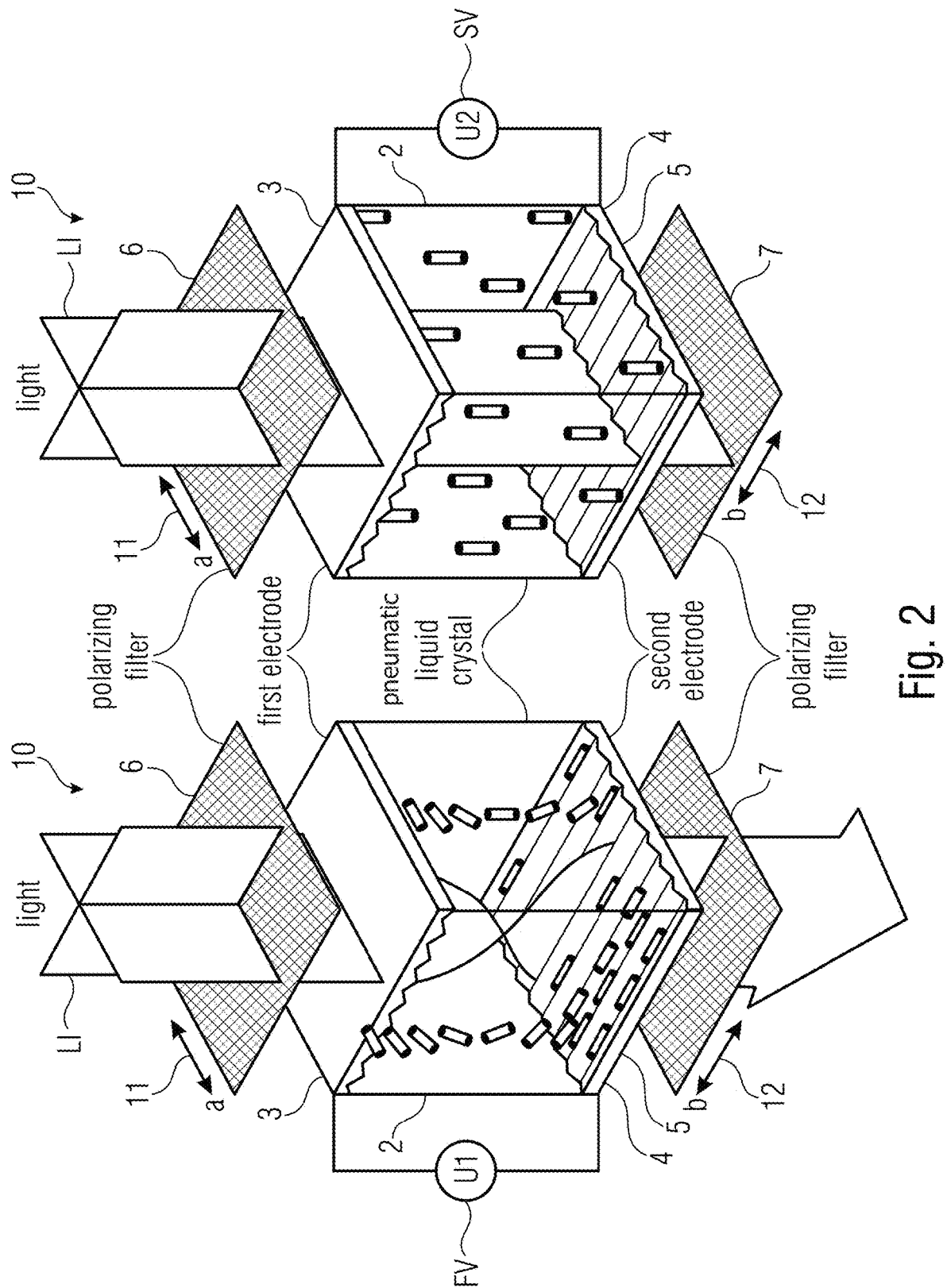
FIG. 2 shows on the left side a schematic, perspective, exploded view of a portion of an optical channel of the stacked optical filter arrangement in an activated state and on the right side a schematic, perspective, exploded view of the portion of the optical channel of the stacked optical filter arrangement in a deactivated state.

FIG. 2 shows on the left side a schematic, perspective, exploded view of a portion of an optical channel 10 of the stacked optical filter arrangement 1 in an activated state and on the right side a schematic, perspective, exploded view of the portion of the optical channel 10 of the stacked optical filter arrangement 1 in an deactivated state.

Figure 3:
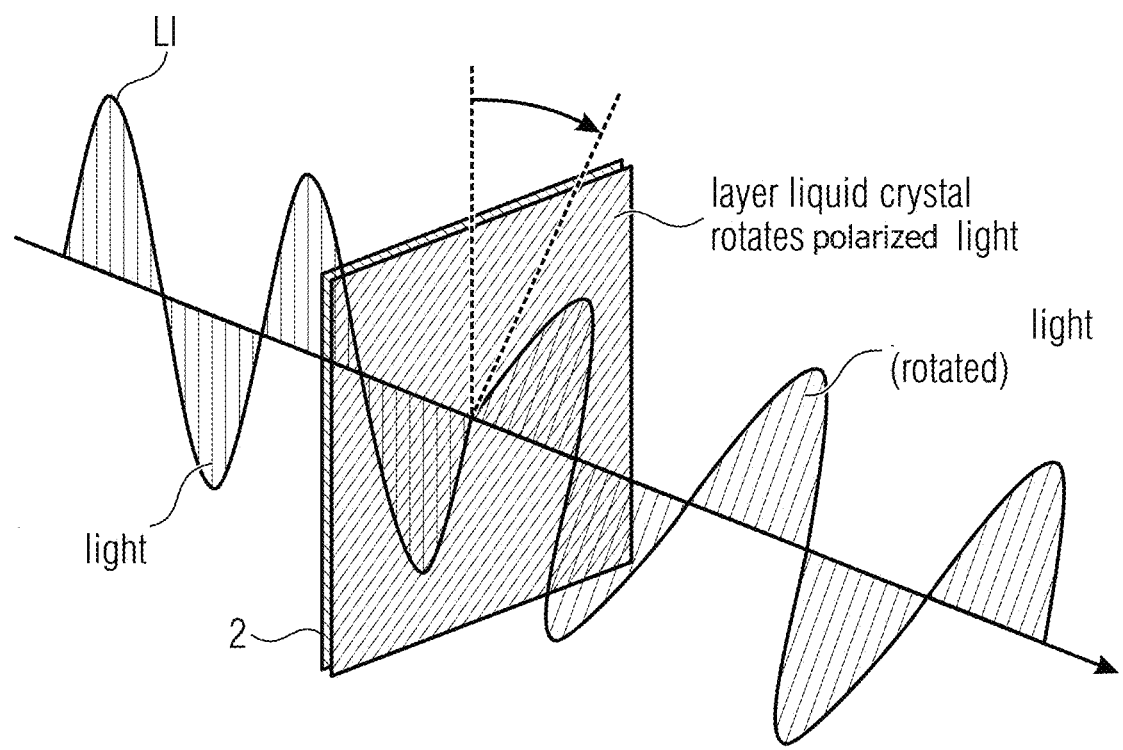
FIG. 3 illustrates a rotation of polarized light in the pneumatic liquid crystal layer.

FIG. 3 illustrates a rotation of polarized light in the pneumatic liquid crystal layer 2.

According to embodiments of the disclosure within each optical channel 10 of the plurality of optical channels 10 a polarizing axis 11 of the portion of the first polarizer layer 6 of the respective optical channel 10 is orientated perpendicular to a polarizing axis 12 of the portion of the second polarizer layer 7 of the respective optical channel 10.

According to embodiments of the disclosure within each optical channel 10 of the plurality of optical channels 10 a polarizing axis 11 of the portion of the first polarizer layer 6 of the respective optical channel 10 is orientated parallel to a polarizing axis 12 of the portion of the second polarizer layer 7 of the respective optical channel 10.

FIG. 1 shows how liquid crystals that are sandwiched between two polarizing filters are used in state of art way to block or pass incident light through the construction.

When two polarizing filters 6, 7 are arranged along perpendicular polarizing axes, light LI entering from above (incident light) as shown in FIG. 2, may be redirected 90 degrees along the helix arrangement of the liquid crystal molecules 2 as further elaborated in FIG. 3, so that it passes through the lower filter 7 then the first voltage FW is applied. On the other hand, when the second voltage SV is applied, the liquid crystal molecules 2 straighten out of their helix pattern and stop redirecting the angle of the light LI, thereby preventing incident light LI from passing through the lower filter 7.

Figure 4:
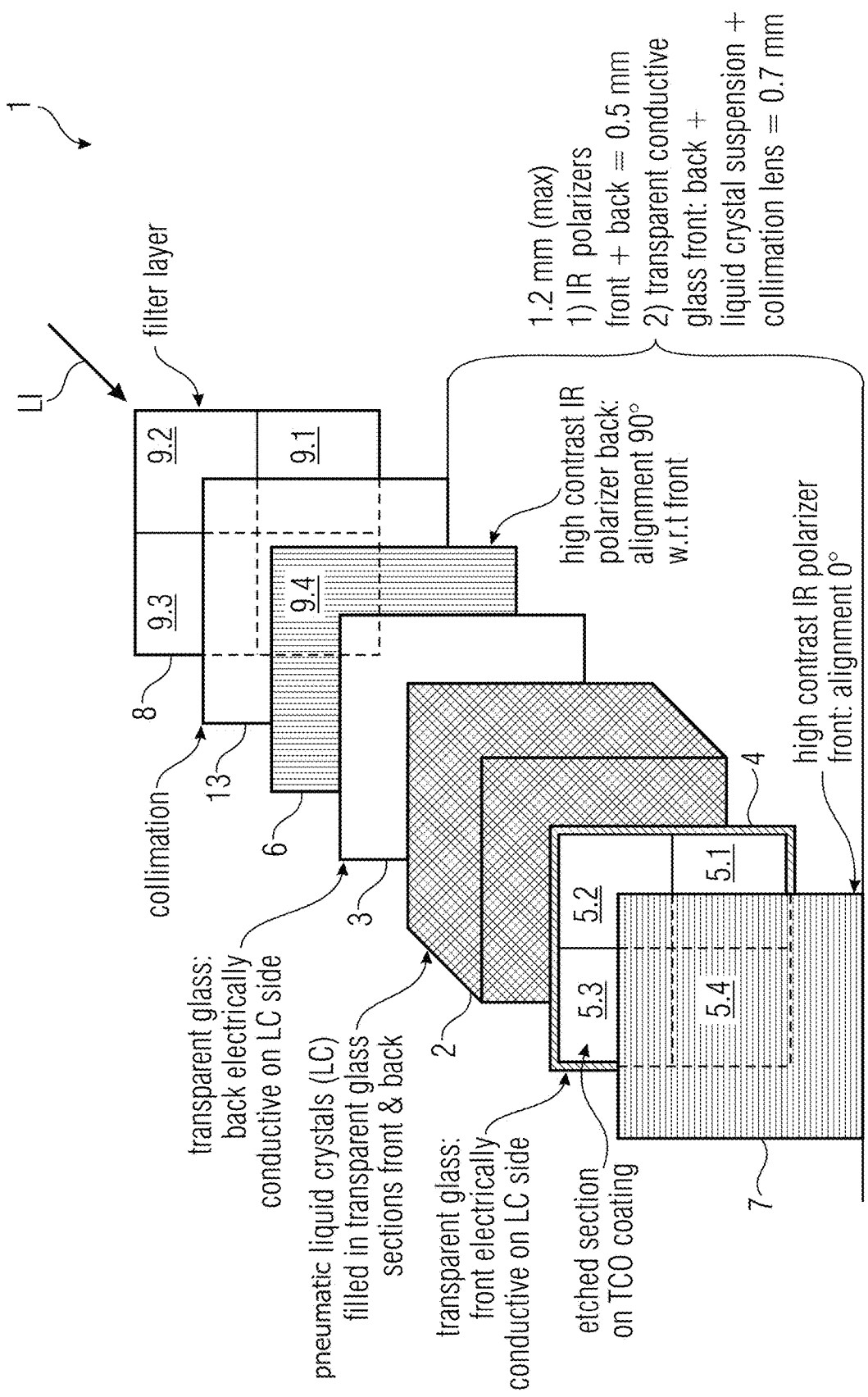
FIG. 4 shows a schematic, perspective, exploded view of a second embodiment of a stacked optical filter arrangement for a photoacoustic spectrometry device for multi-gas sensing.

FIG. 4 shows a schematic, perspective, exploded view of a second embodiment of a stacked optical filter arrangement 1 for a photoacoustic spectrometry device for multi-gas sensing.

The second embodiment is based on the $1^{st}$ embodiment of the stacked optical filter arrangement 1 so that in the following only differences are discussed.

According to embodiments of the disclosure the first transparent electrode layer 3 comprises a glass layer having a conductive coating.

According to embodiments of the disclosure the second transparent electrode layer 4 comprises a glass layer having a conductive coating, wherein the conductive coating is structured in order to form the plurality of electrode segments 5 of the second transparent electrode layer 4.

According to embodiments of the disclosure the filter layer 8 is arranged at an end of the stacked optical filter arrangement 1.

According to embodiments of the disclosure the stacked optical filter arrangement 1 comprises a collimation arrangement 13 for parallelizing the light LI, wherein each optical channel of the plurality of optical channels 10 comprises a portion of the collimation arrangement 13.

According to embodiments of the disclosure the collimation arrangement 13 comprises a Fresnel lens.

According to embodiments of the disclosure at least one of the filter segments 9 is a wavelength insensitive filter segment 9.5, which is transparent at least for wavelengths between 3 μm and 5 μm.

As depicted in FIG. 4, the stacking of thin layers 2 to 7 of all the remaining elements below and over the kernel results into 1.2 mm thin filter stack 1, that is stacked on top of bottom layer 8. When exposed to an emitter or heater through bottom layer 8, the stack of layers 1 to 8 can be effective in selecting and emitting a wavelength pertaining to a single gas through one of the sections 5.1 to 5.4.

Each of the sections 9.1 to 9.4 may select and emit one wavelength pertaining to a target gas that is to be detected. In a concrete terms, section 9.1 may select w1=4.2 μm for gas $CO_2$, section 9.2 may select w2=4.67 μm for gas CO, section 9.3 may select w3=3.3 μm for gas $CH_4$ and, section 9.2 may select w4=4.5 μm for greenhouse gas $N_2O$.

To measure/detect the presence of $CO_2$ in the environment, the optical channel 10 of section 9.1 may be activated so that it is transparent for $w_1$, while all other wavelengths are blocked by deactivating the optical channels of sections 9.1 to 9.4.

After measurement of $CO_2$, if, for example, detection/measuring of $CH_4$ is required, the optical channel of section 9.3 may be activated while all channels of the other sections may be deactivated. This process may continue as per each gas under detection.

Figure 5:
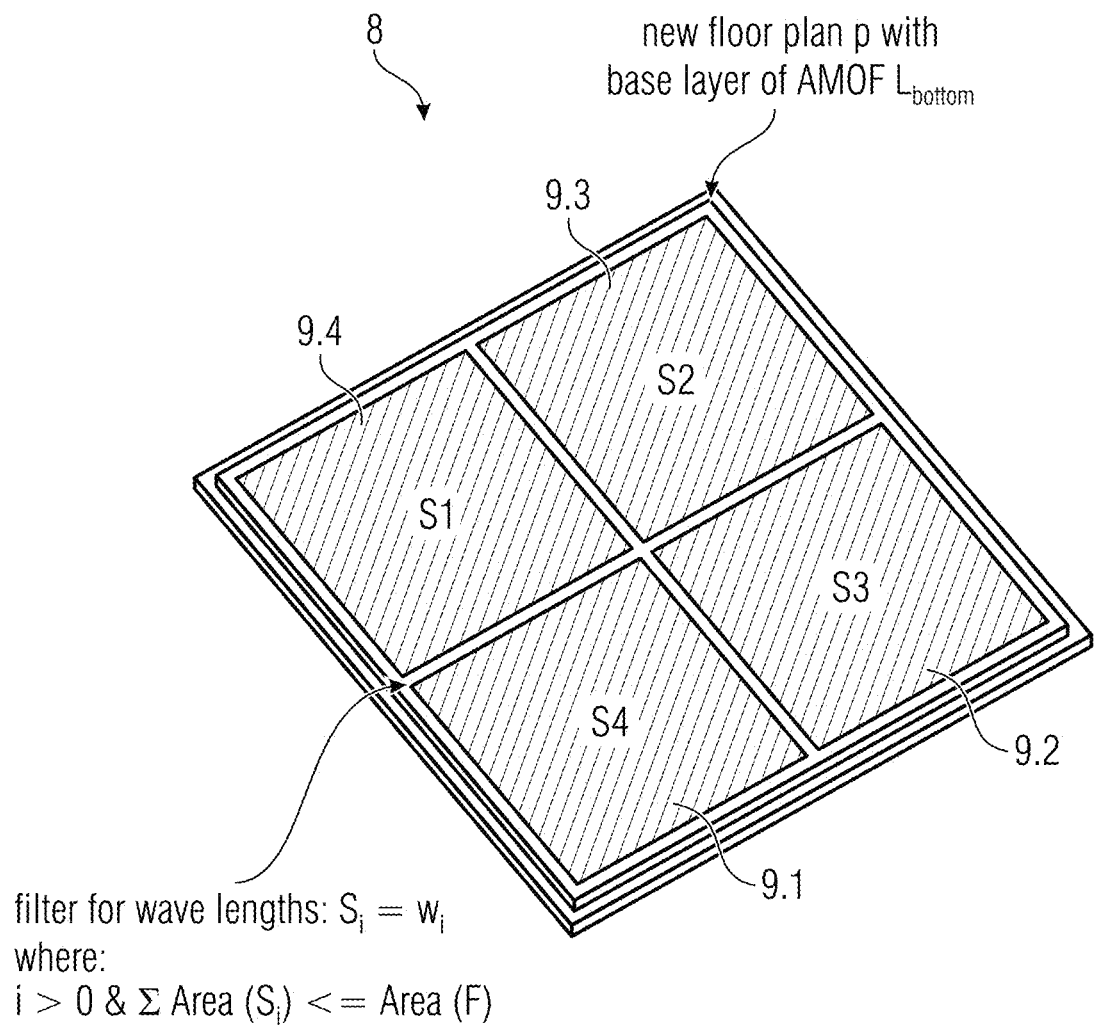
FIG. 5 illustrates a first exemplary floor plan for the filter layer for the stacked optical filter arrangement.

FIG. 5 illustrates a first exemplary floor plan for the filter layer 8 for the stacked optical filter arrangement 1. The stacked optical filter arrangement 1 is constructed according to a concept which may be called "Active Matrix Opto-Filter" (AMOF). The optical filter layer 8 which has an area of F is divided into filter segments (subsections) 9 as shown in FIG. 5. The floor plan P of the filter layer 8 comprises a plurality of filter segments 9, wherein each filter segment 9 has an area $S_i$ which selects and emits a wavelength $w_i$, for a corresponding gas $G_i$.

Depending on transmissivity and other constraints on emission, the area $S_i$ of each section could be different or same with condition that $\Sigma S_i <= F$.

This new floor plan P of fixed wavelength filter sections 9 may be referred to as bottom layer $L_{bottom}$.

Figure 6:
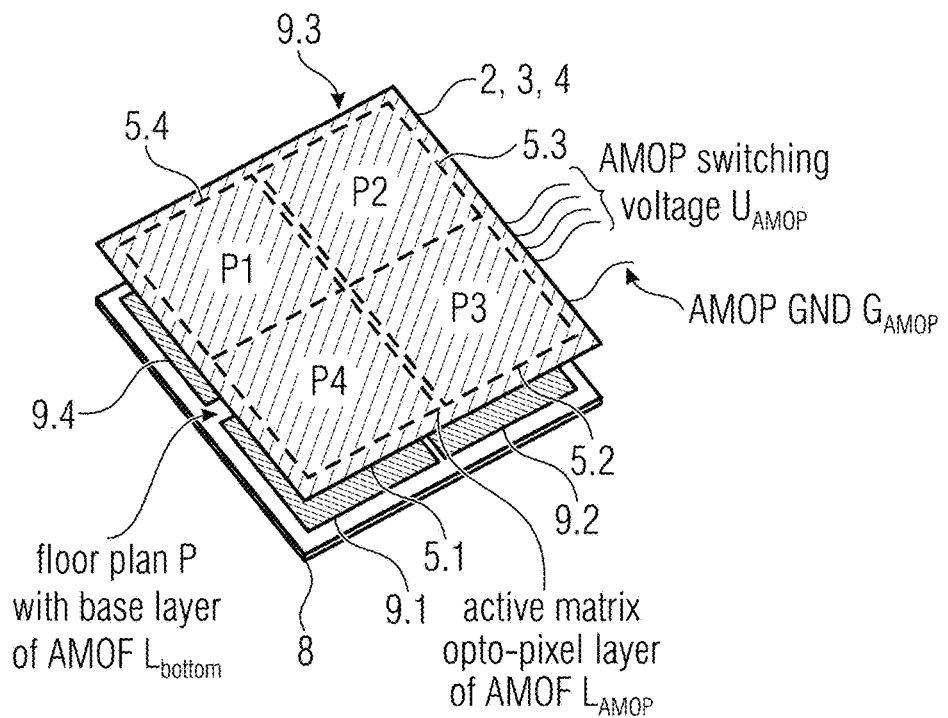
FIG. 6 illustrates an exemplary floor plan for the second transparent electrode layer for the stacked optical filter arrangement, which corresponds to the first floor plan for the filter layer.
Figure 6:
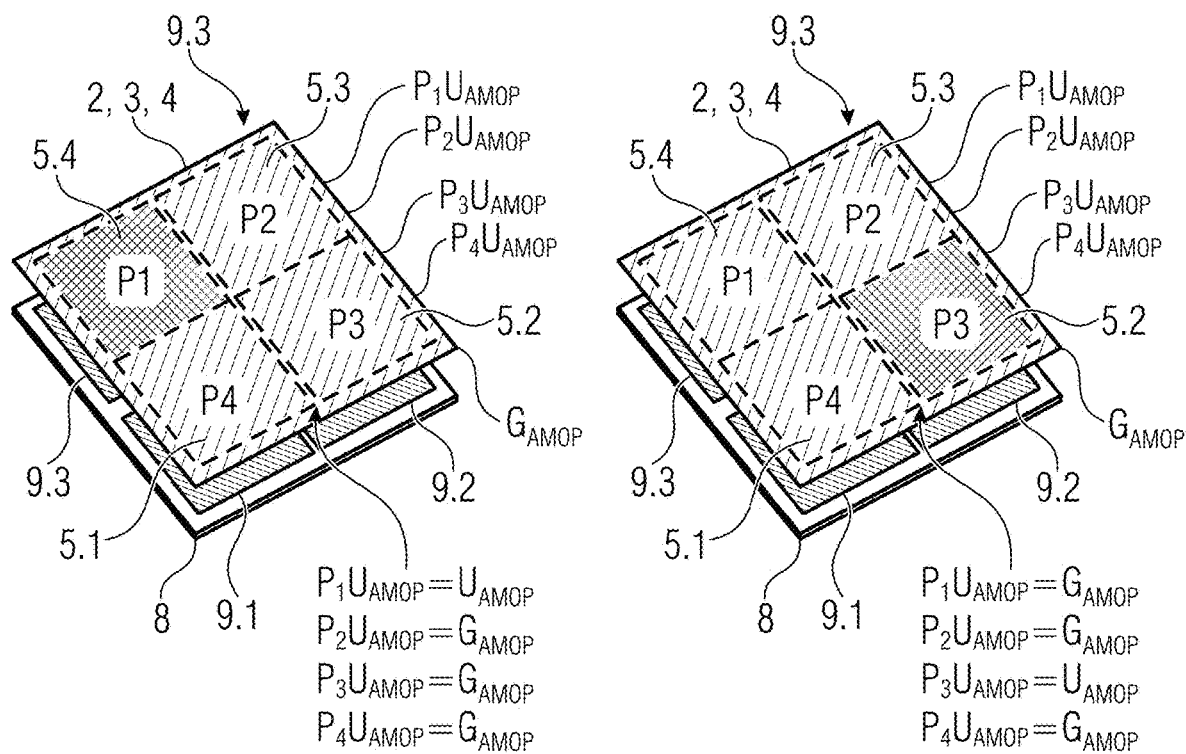

FIG. 6 illustrates an exemplary floor plan for the second transparent electrode layer 4 of the stacked optical filter arrangement 1, which corresponds to the first floor plan for the filter layer 8.

The pneumatic liquid crystal layer 2, the first transparent electrode layer 3 and the second transparent electrode layer 4 may be referred to as "Active Matrix Opto-Pixel Layer (AMOP)". Each of the plurality of electrode segments 5 forms, together with a portion of the first electrode layer 3 and a portion of the pneumatic liquid crystal layer 2, an active matrix opto-pixels $P_i$ having a floorplan $L_{AMOP}$ such that, Contour($S_i$)==Contour ($P_i$), in particular Polygonal Contour($S_i$)==Polygonal Contour ($P_i$), or floorplan ($L_{bottom}$)==floorplan ($L_{AMOP}$).

Active Matrix Opto-Pixel Layer 2, 3, 4 is stacked and fixed over base layer 8 such that each pixel $P_i$ can be individually controlled by means of application of external voltage through conducting path/channel attached through transparent conductive coating layer as shown in FIG. 6. Here in this embodiment, an external voltage controls individual pixel $P_i$ from $L_{AMOP}$, which is known as switching voltage $U_{AMOP}$ of that pixel, and $G_{AMOP}$ is a level of 0 volts or ground.

Application of $P_iU_{AMOP}=U_{AMOP}$, activates pixel $P_i$. Activation of pixel $P_i$, makes pixel $P_i$ transparent for associated wavelengths to which $P_i$ is sensitive to. Once activated, $P_i$ remains activated until $P_iU_{AMOP}=G_{AMOP}$ which is a known as deactivation of pixel $P_i$ as shown in FIG. 6, where pixel $P_1$ and $P_3$ are activated. Therefore, to detect gas $G_i$ with a wavelength $w_i$, pixel $P_i$ is activated making it transparent for its corresponding wavelength $w_i$, and on the other hand remaining pixels are deactivated making them non-transparent for their corresponding wavelengths.

Figure 7:
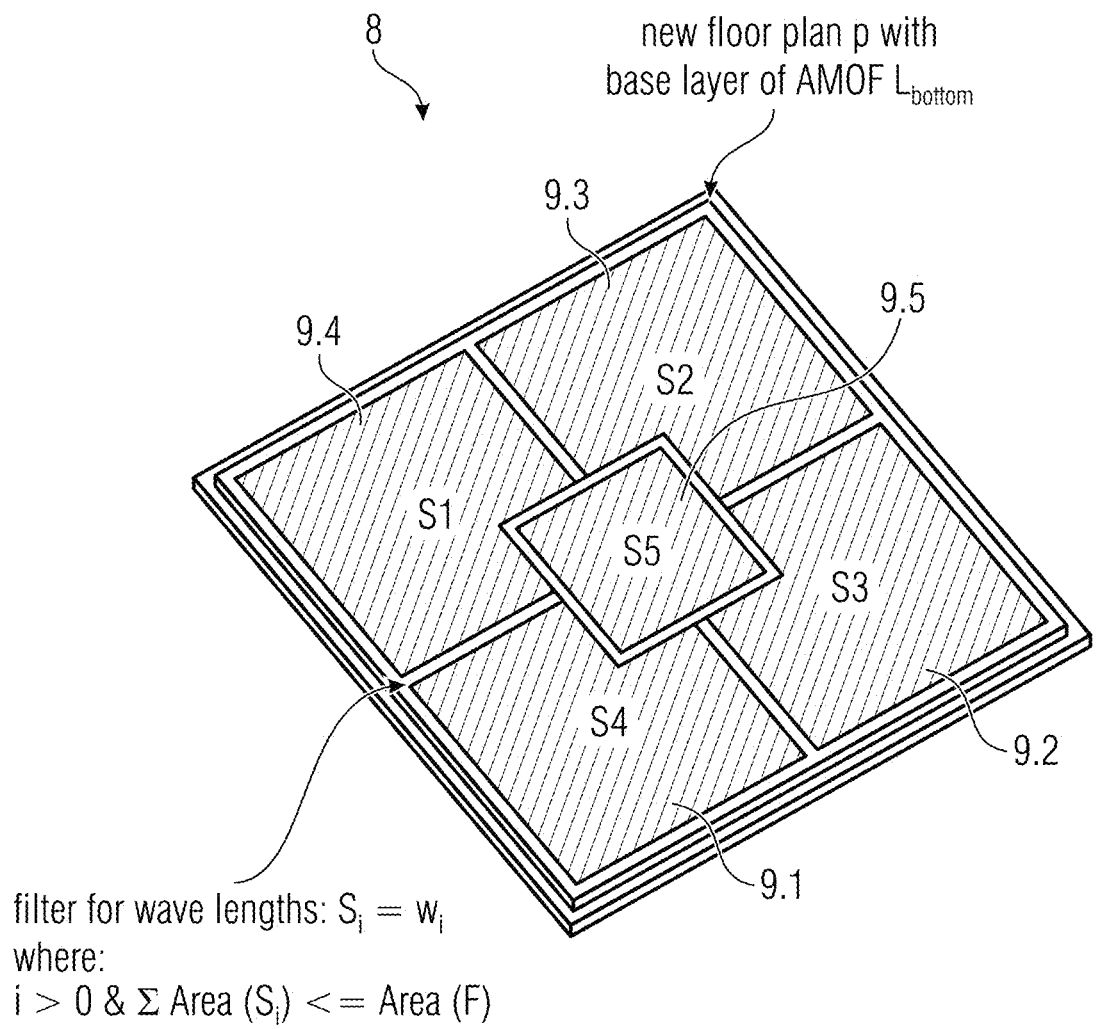
FIG. 7 illustrates a second exemplary floor plan for the filter layer for the stacked optical filter arrangement.

FIG. 7 illustrates a second exemplary floor plan for the filter layer 8 for the stacked optical filter arrangement 1.

The present disclosure is not limited to the square shape of filter segments 9 as described earlier. Contrary it can be effectively implemented for other shapes and contours of sections of the base layer 8 $L_{BOTTOM}$. As, disclosure is pertaining to photoacoustic spectrometry for multi-gas sensing, following is the preferred embodiment to gain all benefits of the novel disclosure.

As shown in FIG. 7, a single fixed-wavelength filter floor F is divided into sections from 9.1 to 9.5 resulting in coplanar 5 fixed-wavelength filters segments 9. From section 9.1 to 9.4, each section selects and emits a wavelength from wide band infrared incident radiation LI, corresponding to a gas to be detected. For example 9.1 may select and emit $w_i$=4.3 μm for detection/measurement of $CO_2$ and likewise the rest three sections are constructed pertaining to remaining three gases as $CH_4$, $N_2O$ and CO.

The 5th section 9.5 is created such that it does not select any particular infrared radiation, but emits all the incident radiations LI when exposed/fixed on top of heater 101 used in photoacoustic spectrometry. This is to examine the peak power of a heater/emitter during course of work in order to recalibrate heater power against its steady decay. Here, it should be noted that the area S5 of section 9.5 is smaller compared to rest of sections 9.1 to 9.4. This is to ensure that sections with wavelength sensitive filters shall ideally have more effective area.

When exposed to a radiator or heater through bottom layer 8, the stack of layers 1 to 8 can be effective in selecting and emitting either a specific wavelength pertaining to a single gas through sections 9.1 to 9.4 or all wide band incident radiation LI for recalibration of the heater/emitter through section 9.5.

In order to measure/detect the presence of a certain gas in the environment, one of the sections 9.1 to 9.5 may be activated, so that the stack 1 is transparent for a specific wavelength, while blocking all other wavelengths by deactivating all other sections. During recalibration section 9.5 may be activated and sections 9.1 to 9.4 deactivated.

During the operation of the stacked optical filter arrangement 1 in a based gas sensor system, the radiator undergoes steady decay over the period of time. Certainly it has a limited lifespan and its efficiency of emission hence subject to deterioration. This loss has to be addressed in order to accurately measure/detect the required gas in its in-situ.

To address this challenge, embodiments propose creation of filter section 9.5 which is wavelength insensitive. Filter section 9.5 does not employ any fixed-wavelength optical filter. Thus, the activation of the optical channel 10 of the filter section 9.5 corresponding to section S5, makes the respective optical channel 10 transparent to wideband incident radiations from the radiator. This helps the acoustic detector of a sensor to measure available peak power of emission of the radiator at any point of time during the operation of system. A sensor, therefore, can enquire, examine and compensate for any deterioration of the radiator by activation of the optical channel of filter section 9.5 and by deactivating optical channels 10 of the other filter sections.

By means of activation of the optical channel 10 of the wavelength insensitive filter section 9.5, the entire power of the radiator is forwarded to a detection chamber. This causes sudden expansion of air inside the chamber resulting in exhale through in-out port. Once an optical channel 10 of the wavelength insensitive filter section 9.5 is deactivated, chamber operation and temperature return to equilibrium conditions. This results into inhaling meaning that filling the chamber with outside air for detection purposes.

Hence, with current embodiment fast inhale and exhale activities can be carried out for faster response. It is especially suitable for larger volume detection chambers/cavities.

Figure 8:
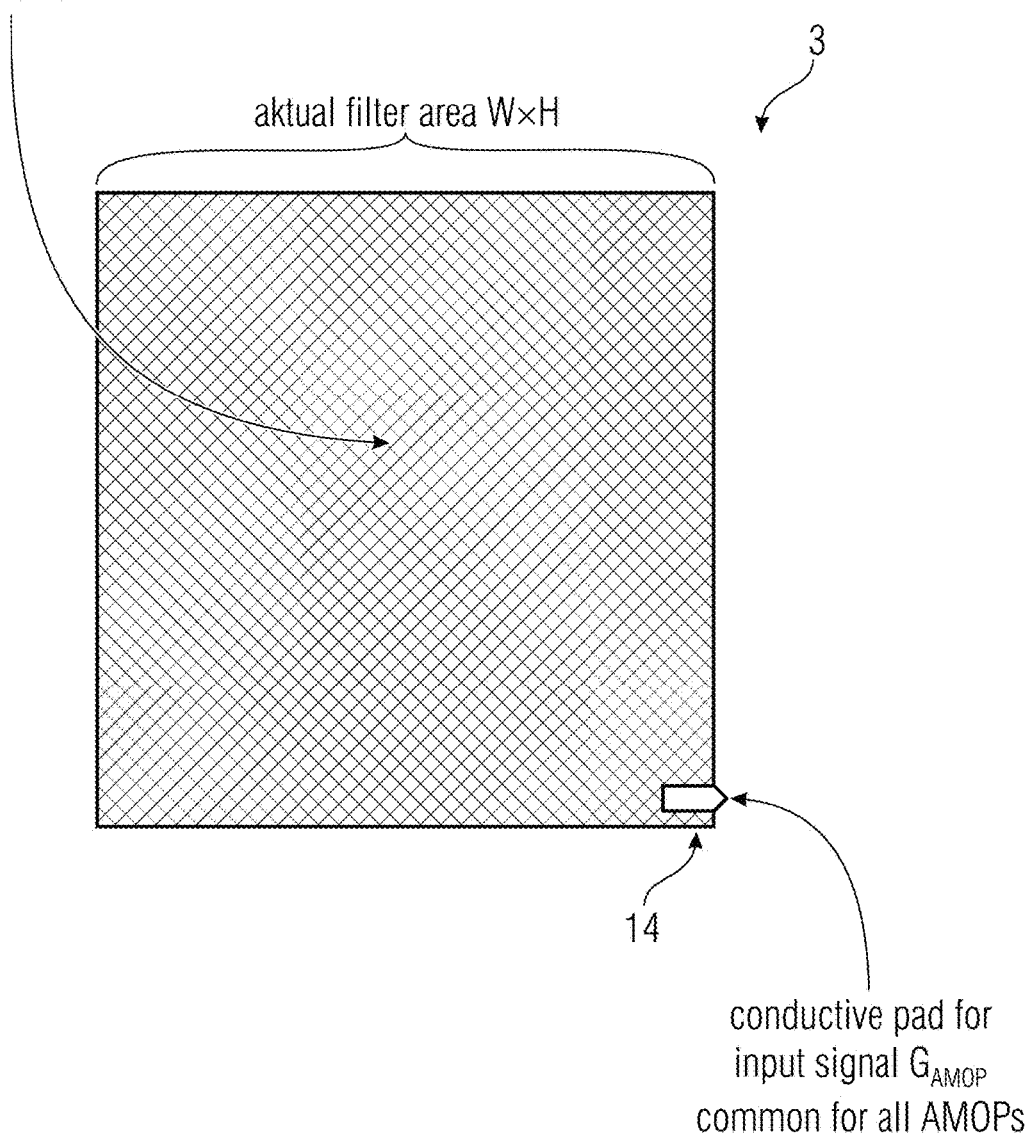
FIG. 8 shows a schematic top view of an exemplary first transparent electrode layer.

FIG. 8 shows a schematic top view of an exemplary first transparent electrode layer 3. The next step in preparing the stacked optical filter arrangement is to prepare front and back transparent glass panels 3.4 with conductive coating on one of the sides. FIG. 8 shows the back panel in preparation.

The area of back glass panel 3 shall ideally match the exact contour of the floor plan created in steps, i.e., width and breadth of $L_{BOTTOM}$ shall ideally be same with width and breadth of back glass panel. Both the front and back glass panels 3, 4 shall ideally also be electrically conductive on one side. This can be achieved by deposition of transparent and electrically conductive material, like TCO, ITO or AZO etc.

The back panel 3 that is to be exposed to $L_{BOTTOM}$ will also act as a common ground for all the sections and suspension of liquid crystal molecules 2 therein. In order to achieve this, a small metal pad 14 is attached to conductive side of panel 3, so that external wire can be linked/connected to it by means of soldering etc.

Figure 9:
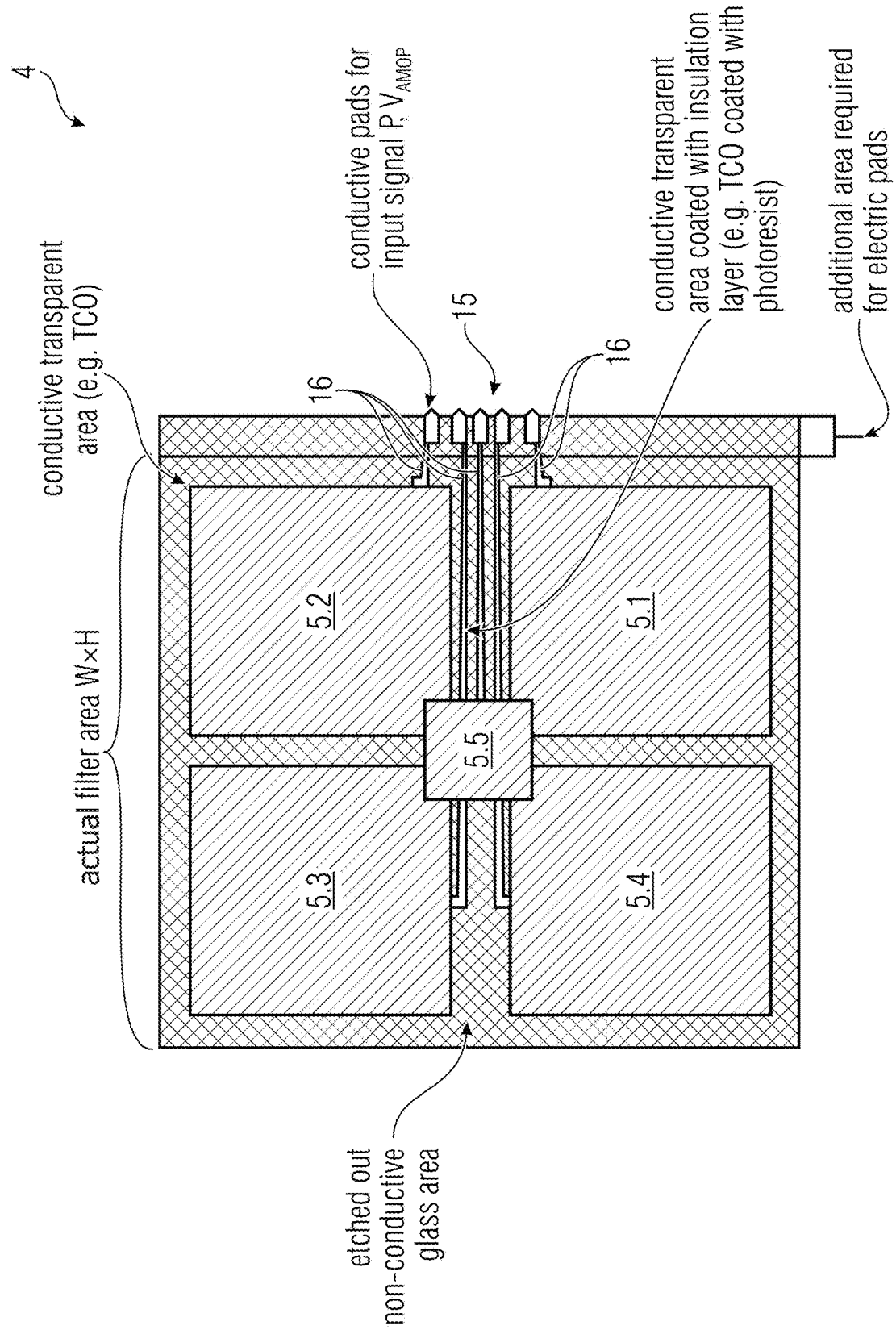
FIG. 9 shows a schematic top view of an exemplary second transparent electrode layer.

FIG. 9 shows a schematic top view of an exemplary second transparent electrode layer 4. FIG. 9 shows the front glass panel 4 after preparation. It can be noticed that the area of front glass panel 4 is slightly larger. This extension is shown in area and used to hold all conductive pads that are connected to each section and are used for inputting $U_{AMOP}$ signal to corresponding section 9. Similar to back panel 3, initially, the front panel 4 shall ideally have entire one side coated with transparent electrically conductive material as explained earlier.

This conductive side is etched out in such a way that five areas 5.1 to 5.5 corresponding to exact contour of five sections 9.1 to 9.5 from $L_{BOTTOM}$ will have conductive coating together with thin conductive lines extended to conductive pads 5.1 to 5.5. Further, these thin conductive lines are coated with insulation material, for example a photoresist etc.

The conductive pads 15 are then placed in extended area such that they are electrically connected to corresponding section 5.1 to 5.5 by means of corresponding thin conductive lines 16 extending from one of the sections 5 to one of the pads 15. This can be achieved by removing an insulation layer (here photo resists) from the lines 16 in the extended area and placing a pad 15 by means of conductive adhesive etc. This is shown in FIG. 9, where electrically conductive and transparent sections 5.1 to 5.5 are shown in dark grey, etched out non-conductive area is shown in white and conductive lines 16 extending from the sections and having an insulation coating are shown in grey.

Both front panel 4 and back panel 3 are then lightly brushed/rubbed from their conductive side in such a way that direction of brushing/rubbing is parallel to direction of nearest polarizer 6, 7. For example, front panel 4 is brushed in a direction parallel to the direction of front polarizer 7. Brushing actually helps align the liquid crystal molecules 2 correctly when suspended between two glass panels 3, 4.

Figure 10:
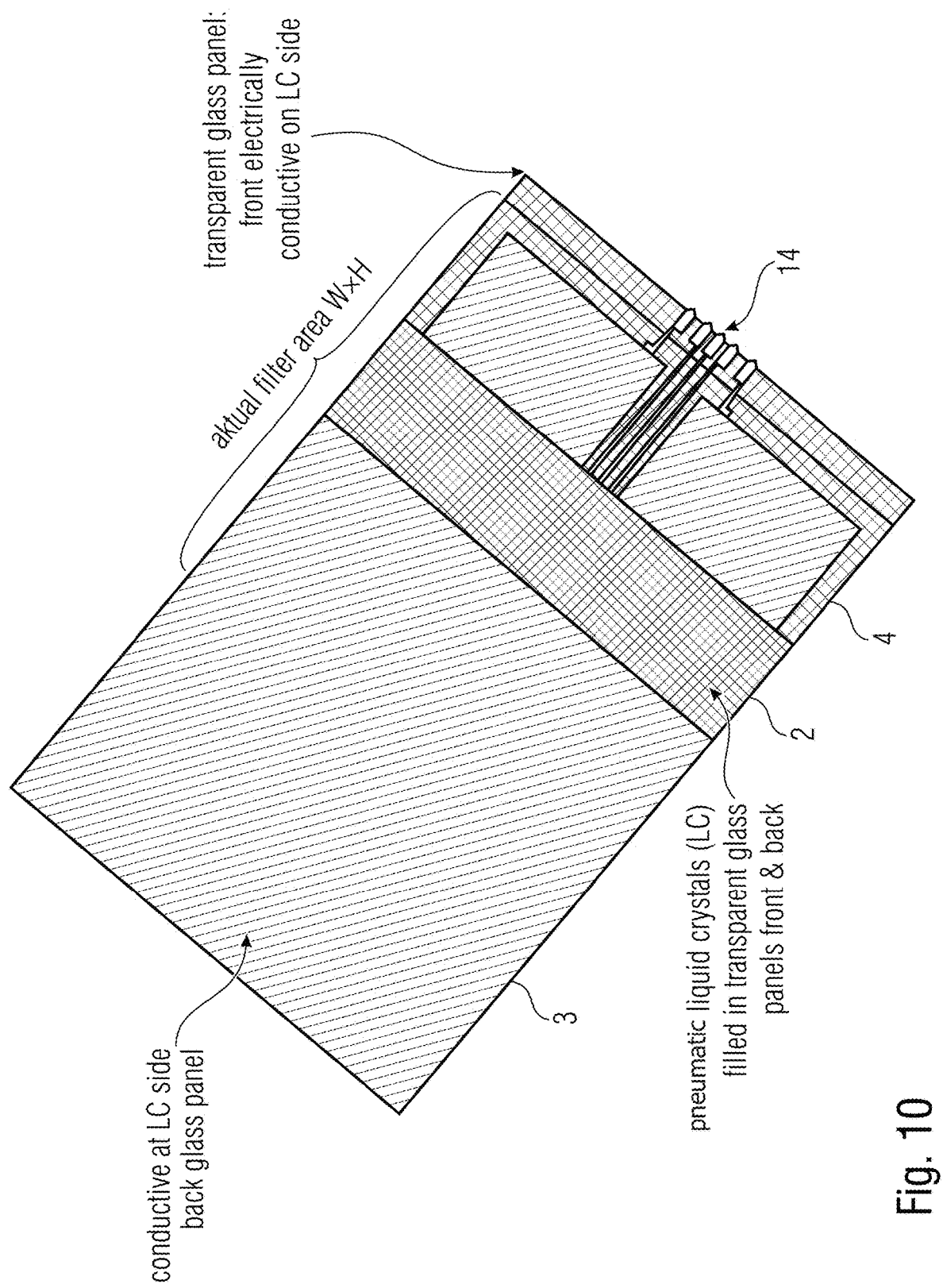
FIG. 10 shows a schematic, exploded view of an exemplary pneumatic liquid crystal layer arranged between the exemplary first transparent electrode layer and the exemplary second transparent electrode layer.

FIG. 10 shows a schematic, exploded view of an exemplary pneumatic liquid crystal layer 2 arranged between the exemplary first transparent electrode layer 3 and the exemplary second transparent electrode layer 4.

Next step during the preparation of the stacked optical filter arrangement 1 is to actually add pneumatic liquid crystal solution between front and back panels produced during previous steps. The choice of pneumatic liquid crystal varies to target factors like temperature range, switching speed etc. The disclosure recommends but does not limit the selection of liquid crystals to 5CB, 5OCB and PCH5. FIG. 10 shows how liquid crystal solution is suspended between front and back glass panels 3, 4.

Figure 11:
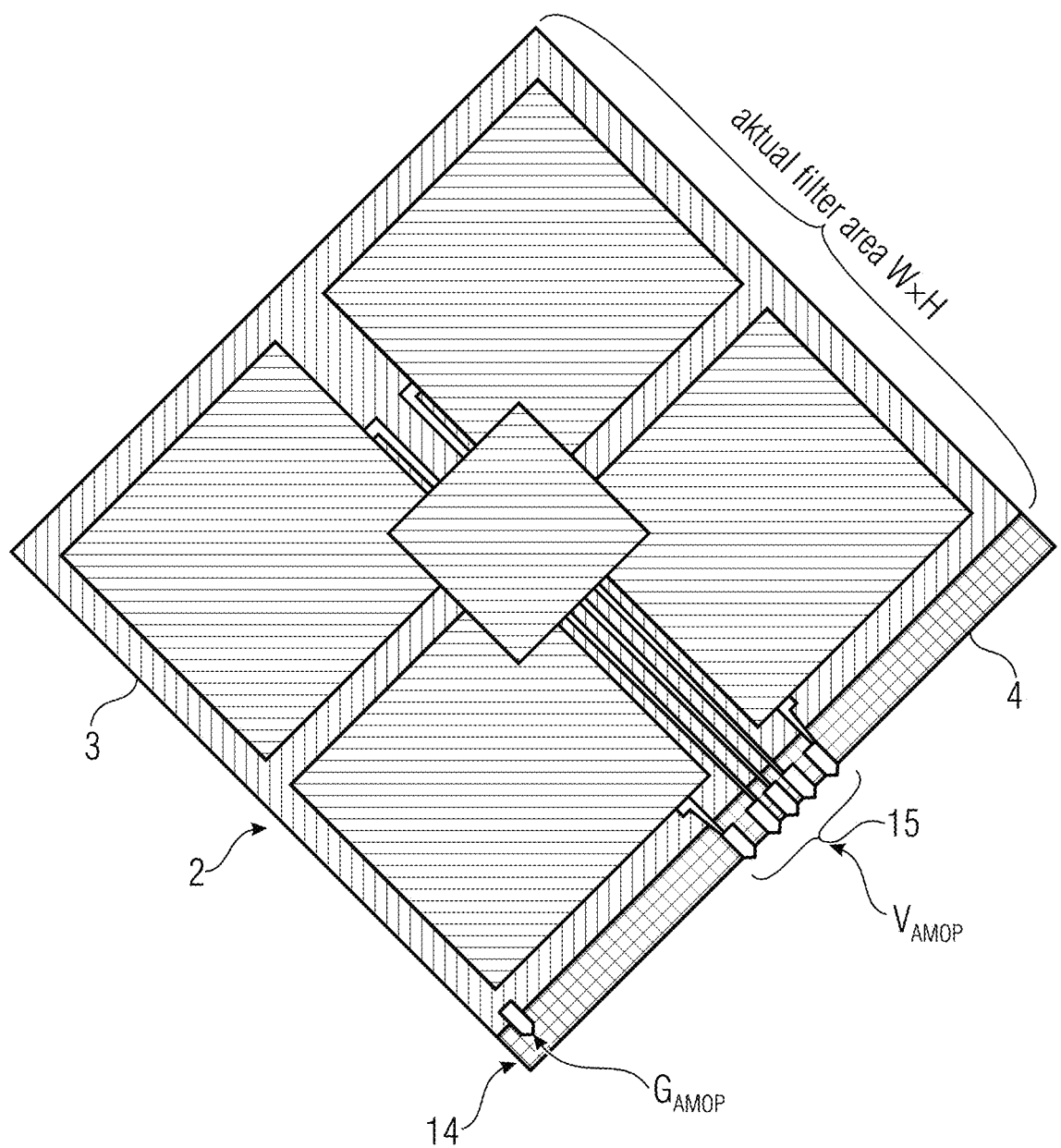
FIG. 11 shows a schematic top view of an exemplary stack comprising the exemplary pneumatic liquid crystal layer, the exemplary first transparent electrode layer and the exemplary second transparent electrode layer.

FIG. 11 shows a schematic top view of an exemplary stack comprising the exemplary pneumatic liquid crystal layer 2, the exemplary first transparent electrode layer 3 and the exemplary second transparent electrode layer 4. FIG. 11 shows the final view of transparent conductive front and back glass panels 3, 4 with the liquid crystal layer 2 in the middle prepared as a result of the previous step. The stack of layers 2, 3 and 4 may also be termed as kernel 2, 3, 4 of the stacked optical filter arrangement 1 or kernel 2, 3, 4 in short. Here each section of the kernel will result into one pixel. For example section 5.1 will result into a formation of pixel $P_1$ and so on.

Finally, the kernel 2, 3, 4 is then sandwiched between front and back high contrast polarizers 6, 7, optionally together with flat collimation lens 13 all are having dimensions as that of the actual filter dimensions (W×H) as per the arrangement shown in FIGS. 1 and 4.

Figure 12:
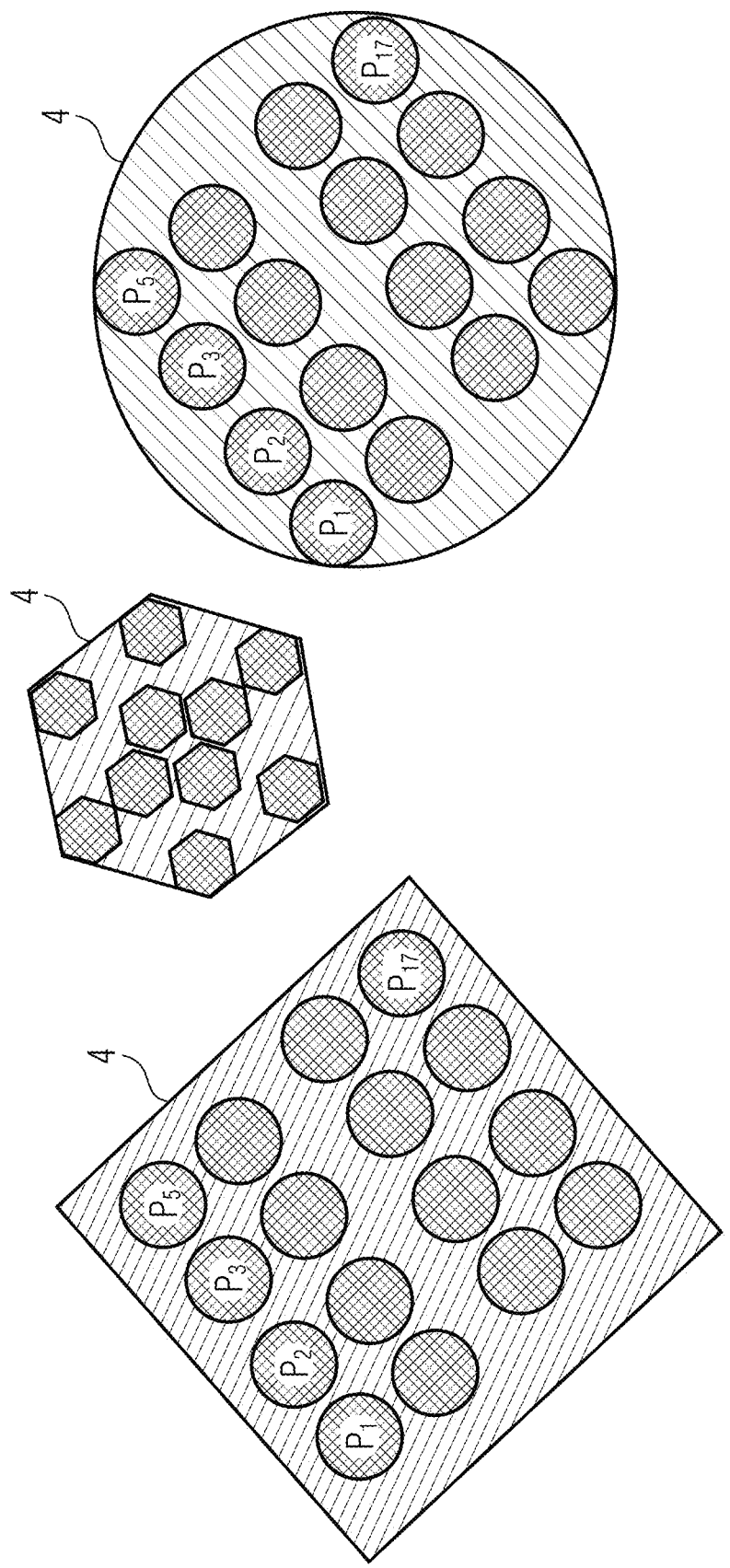
FIG. 12 shows in a schematic top view further exemplary floor plans for the filter layer and the second electrode layer.

FIG. 12 shows in a schematic top view further exemplary floor plans for the filter layer 8 and the second electrode layer 4. The scope of the disclosure is not limited to detecting just four gases at the time. The same concept can be extended to N number of gases by means of different designs, shapes, and geometries of the filter sections 9 together with corresponding electrode segments 5.

Figure 13:
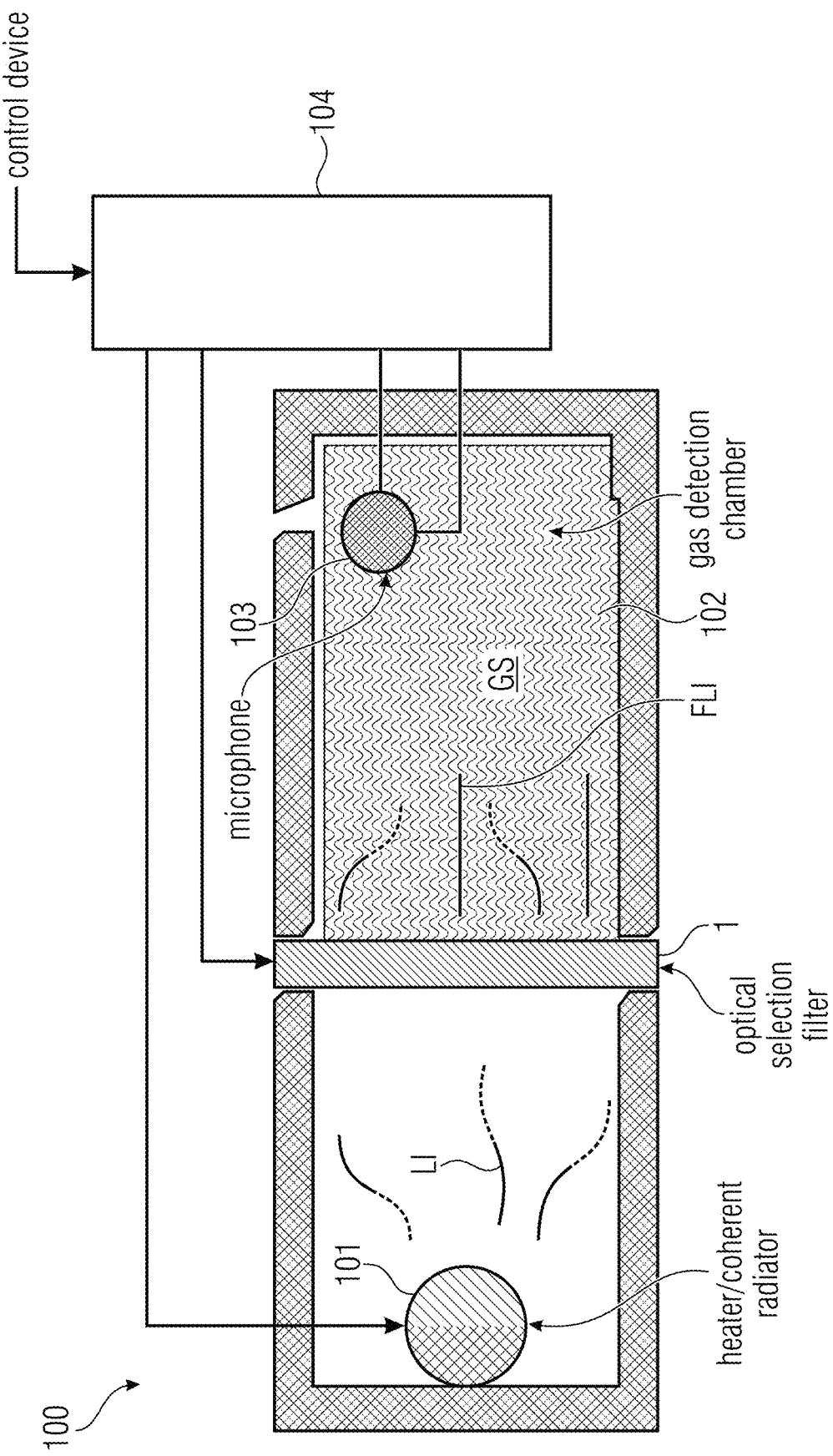
FIG. 13 shows a schematic side view of a first embodiment of a photoacoustic spectrometry device for multi-gas sensing.

FIG. 13 shows a schematic side view of a first embodiment of a photoacoustic spectrometry device 100 for multi-gas sensing. The photoacoustic spectrometry device 100 comprises:

a radiator 101 configured for emitting light LI, which is coherent;

a stacked optical filter arrangement 1 according to the disclosure, wherein the stacked optical filter arrangement 1 is configured for receiving and filtering the light LI from the radiator 101 in order to produce filtered light FLI;

a gas detection chamber 102 configured for exposing a mixture of gases GS to the filtered light FLI;

a microphone 103 configured for detecting sound in the detection chamber 102, which is caused by exposing the mixture of gases GS to the filtered light FLI; and a control device 104 configured for controlling the photoacoustic spectrometry device 100.

Figure 14:
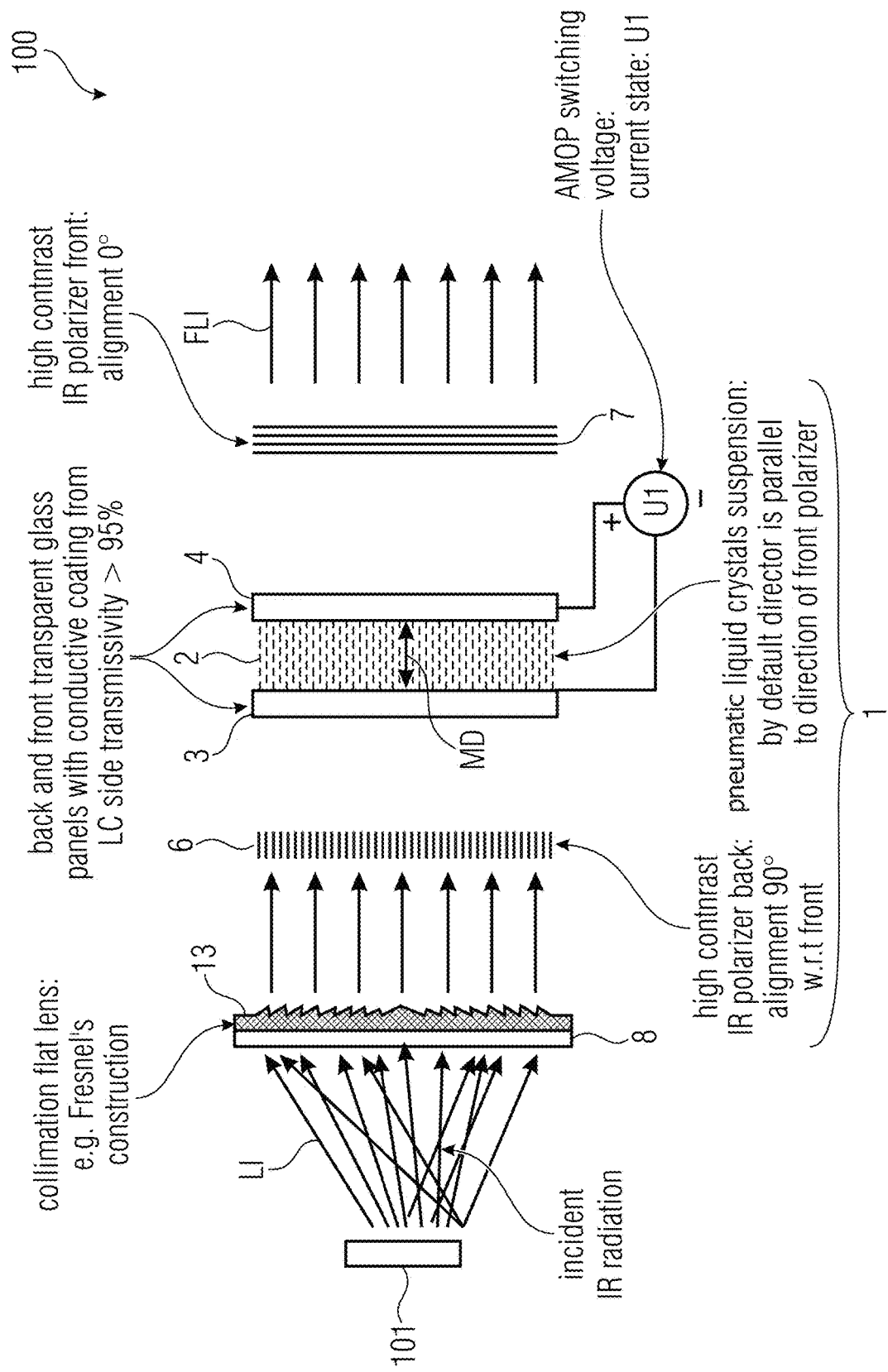
FIG. 14 shows a schematic side view of a second embodiment of a photoacoustic spectrometry device for multi-gas sensing.

FIG. 14 shows a schematic side view of a second embodiment of a photoacoustic spectrometry device 100 for multi-gas sensing.

According to embodiments of the disclosure the radiator 101 is arranged on a first side of the filter layer 8 of the stacked optical filter arrangement 1, and wherein the first polarizer layer 6 and the second polarizer 7 are arranged on a second side of the filter layer 8 of the stacked optical filter arrangement 1.

According to embodiments of the disclosure the radiator 103 is configured for emitting a continuous spectrum comprising at least wavelengths between 3 µm and 5 µm.

According to embodiments of the disclosure the control device 104 is configured for controlling a measuring procedure, in which at a same time interval:

one optical channel 10 of the plurality of optical channels 10, which comprises one of the wavelength sensitive filter segments 9, is alternately activated or deactivated at a switching frequency by alternately applying the first voltage FV or the second voltage SV between the first transparent electrode layer 3 and the electrode segment 5 of the second transparent electrode layer 4 of the respective optical channel 10;

all other optical channels 10 of the plurality of optical channels 10, which comprise a wavelength insensitive filter segment 9 or one of the wavelength sensitive filter segments 9 being transparent for a different wavelength than the wavelength sensitive filter segment 9 of the one optical channel 10, are deactivated by applying the second voltage SV between the first transparent electrode layer 3 and the electrode segment 5 of the second transparent electrode layer 4 of the respective optical channels 10; and the sound in the detection chamber is detected by using the microphone 103.

According to embodiments of the disclosure the control device 104 is configured for controlling a calibrating procedure, in which at a same further time interval:

one optical channel 10 of the plurality of optical channels 10, which comprises the wavelength insensitive filter segment 9, is alternately activated or deactivated at the switching frequency by alternately applying the first voltage FV or the second voltage SV between the first transparent electrode layer 3 and the electrode segment 5 of the second transparent electrode layer 4 of the respective optical channel 10;

all other optical channels 10 of the plurality of optical channels 10, which comprise a wavelength sensitive filter segment 9, are deactivated by applying the second voltage SV between the first transparent electrode layer 3 and the electrode segment 5 of the second transparent electrode layer 4 of the respective optical channels 10; and the sound in the gas detection chamber 102 is detected by using the microphone 103 in order to estimate a decay of the radiator 101 by measuring a strength of the sound.

As shown in FIG. 14, the stacked filter 1 comprises a collimation lens 13 in order to bring parallel polarization to randomly polarized IR wavelength emitted out of IR emitter/heater 101 This increases transmissivity dramatically (more than 95%) compared to state of art devices.

Further, high contrast IR polarizers 6, 7 with a transmittance >95% for mid-range IR (3 um to 5 um) together with electrically conductive transparent glass panels 3, 4 do not hinder this transmissivity below 95% compared to incident peak power. All the elements of the stacked filter 1 are layered up tightly measuring a thickness less than a millimeter in a sequence as shown in FIG. 14, with virtually no air/medium between the layers so that transmissivity throughout the optical paths 10 is retained.

By default, the director of the pneumatic liquid crystal molecules 2, suspended between electrically conductive glass panels 3, 4, is parallel to front IR polarizer's direction. This means, when switching voltage is set to $G_{AMOP}$, the layers 2, 3, 4 can transmit incident infrared radiation as is, implying activation of the respective optical channel 10. This is because of the liquid crystal molecules 2 changing the polarization of infrared radiations passing through them in direction of its director. On the other hand, when switching voltage is set to $U_{AMOP} \gg G_{AMOP}$, this causes reorientation of the director of pneumatic liquid crystal molecules 2 making them perpendicular to front infrared polarizer, causing the respective optical channel 10 opaque.

Figure 15:
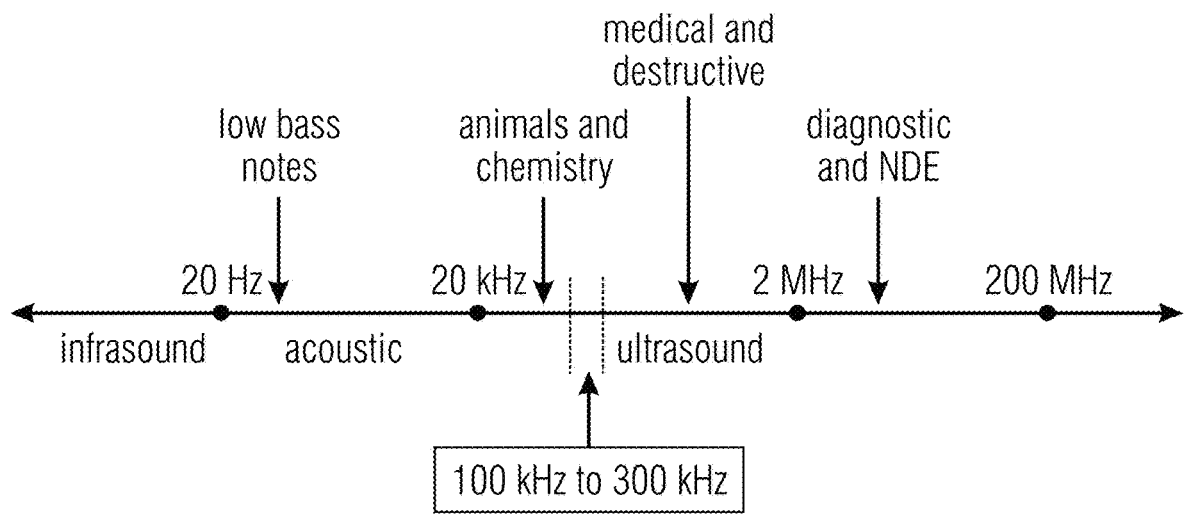
FIG. 15 illustrates the sound occupation according to frequency ranges by different entities.

FIG. 15 illustrates the sound occupation according to frequency ranges by different entities.

According to embodiments of the disclosure the switching frequency is in a range from 100 kHz to 300 kHz. By these features the signal-to-noise ratio of a measurement may be enhanced as this frequency range is less polluted by other sources and of the frequency ranges.

According to embodiments of the disclosure a distance MD between the first transparent electrode layer 3 and the second transparent electrode layer 4 is smaller than a maximum distance between the first transparent electrode layer 3 and the second transparent electrode layer 4, wherein the maximum distance is calculated according to a numerical value equation $d_{max}=T \times U$, wherein $d_{max}$ is the maximum distance in μm, wherein T is a time of oscillation of the switching frequency in μs and wherein U is an absolute value of a difference between the first voltage FV and the second voltage SV in Volts (V).

The time liquid crystal molecules 2 take to reorient from parallel to perpendicular with respect to front or back polarizer 6, 7 is called transition time (i.e., activation to deactivation of the respective channel 10). The transition time Γ for pneumatic liquid crystals cells can be approximated for electric fields >10 V/μm as:

$$\Gamma \approx \frac{d}{U} \tag{1}$$

where U is the switching voltage across the cell divided by distance d between the first transparent electrode layer 3 and the second transparent electrode layer 4.

Therefore, in order to achieve a switching time (here the transition time or time taken by the respective optical channel 10 to transit from deactivated-to-activated state and vice-a-versa) in a range of 10 μs (100 KHz) to 3.3 μs (300 KHz) and considering a first voltage of 0 V and a second voltage of 12 V, a maximum cell gap $d_{max}$ can be calculated according to the numerical value equation $d_{max}=T \times U=3.3 \times 12$ μm≈40 μm.

Similarly, for different voltage ranges and switching frequencies a maximum distance $d_{max}$ can be computed using numerical value equation $d_{max}=T \times U$. During construction of the device by ascertaining that the actual distance MD between back and front conducting glass electrodes does not exceed the calculated maximum distance $d_{max}$, such fast switching frequencies can be guaranteed and hence the device can be further utilized to detect gases in the range of ultrasonic frequencies.

The radiator can be excited in its normal operational frequency, i.e., from infra to audible range. Once the radiator reaches the desired temperature in order to emit coherent radiation including a frequency that is required to detect a target gas the external modulating frequency i.e., a DC voltage supply of consecutive ON and OFF pulses will be fed to the individual optical channel 10 which is required to be operated in ultrasonic range, whereas rest of the optical channels 10 is kept deactivated/opaque.

By these features an improvement of the signal-to-noise ratio of the device may be achieved so that the gas detection becomes more robust in presence of noise. Furthermore, an improvement of a life time of the radiator may be achieved. The resolution of the detection of gases (higher lower ppm/ppb) can be enhanced. Moreover, the detection time can be shortened by multi-folds.

Figure 16:
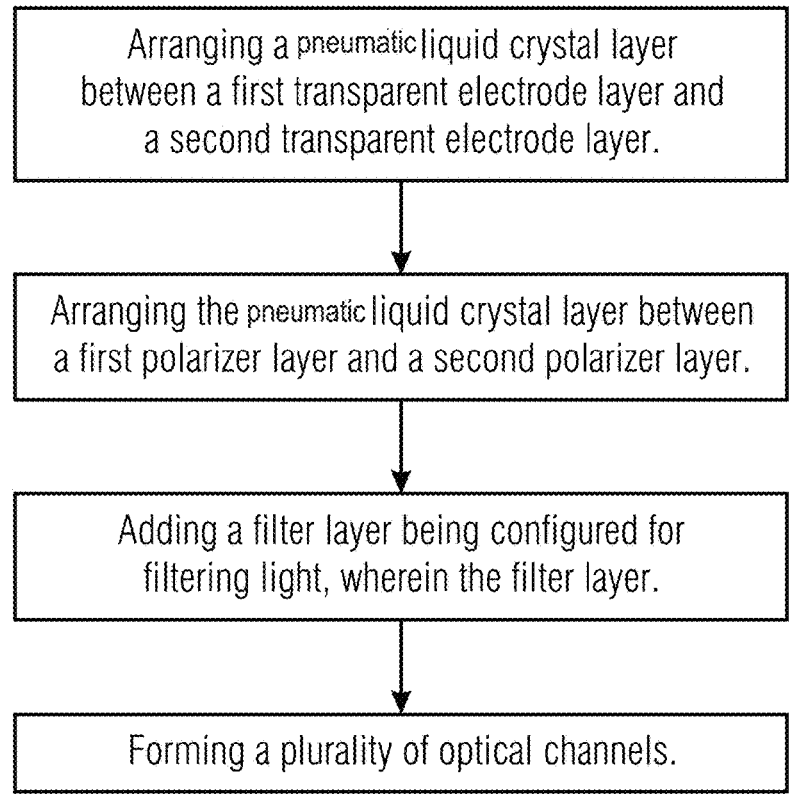
FIG. 16 illustrates a method for manufacturing a stacked optical filter arrangement for a photoacoustic spectrometry device for multi-gas sensing.

FIG. 16 illustrates a method for manufacturing a stacked optical filter arrangement 1 for a photoacoustic spectrometry device 100 for multi-gas sensing. The method comprises the steps:

arranging a pneumatic liquid crystal layer 2 between a first transparent electrode layer 3 and a second transparent electrode layer 4, wherein the second transparent electrode layer 4 comprises a plurality of electrode segments 5 which are electrically isolated from each other;

arranging the pneumatic liquid crystal layer 2 between a first polarizer layer 6 and a second polarizer layer 7;

adding a filter layer 8 being configured for filtering light LI, wherein the filter layer 8 comprises a plurality of filter segments 9, wherein at least two of the filter segments 9 are wavelength sensitive filter segments 9, wherein at least two of the wavelength sensitive filter segments 9 are transparent for different wavelengths; and forming a plurality of optical channels 10;

so that each optical channel of the plurality of optical channels 10 comprises a portion of the pneumatic liquid crystal layer 2, a portion of the first electrode layer 3, one of the plurality of electrode segments 5 of the second transparent electrode layer 4, a portion of the first polarizer layer 6, a portion of the second polarizer layer 7 and one of the plurality of filter segments 9;

so that each optical channel 10 of the plurality of optical channels 10 can be activated independently from the other optical channels 10 of the plurality of optical channels 10 by applying a first voltage FV between the first transparent electrode layer 3 and the electrode segment 5 of the second transparent electrode layer 4 of the respective optical channel 10; and so that each optical channel 10 of the plurality of optical channels 10 can be deactivated independently from the other optical channels 10 of the plurality of optical channels 10 by applying a second voltage SV between the first transparent electrode layer 3 and the electrode segment 5 of the second transparent electrode layer 4 of the respective optical channel 10.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A photoacoustic spectrometry device for multi-gas sensing, the photoacoustic spectrometry device comprising:
    a radiator configured for emitting light, which is coherent;
    a stacked optical filter arrangement, wherein the stacked optical filter arrangement is configured for receiving and filtering the light from the radiator in order to produce filtered light;
    a gas detection chamber configured for exposing a mixture of gases to the filtered light;
    a microphone configured for detecting sound in the gas detection chamber, which is caused by exposing the mixture of gases to the filtered light; and
    a control device configured for controlling the photoacoustic spectrometry device,
    wherein the stacked optical filter arrangement further comprises:
    a pneumatic liquid crystal layer stacked between a first transparent electrode layer and a second transparent electrode layer, wherein the second transparent electrode layer comprises a plurality of electrode segments which are electrically isolated from each other;
    a first polarizer layer and a second polarizer layer, wherein the pneumatic liquid crystal layer is stacked between the first polarizer layer and the second polarizer layer;
    a filter layer being configured for filtering light, wherein the filter layer comprises a plurality of filter segments, wherein at least two of the filter segments are wavelength sensitive filter segments, wherein the at least two of the wavelength sensitive filter segments are transparent for different wavelengths; and
    a plurality of optical channels, wherein each optical channel of the plurality of optical channels comprises a portion of the pneumatic liquid crystal layer, a portion of the first transparent electrode layer, one of the plurality of electrode segments of the second transparent electrode layer, a portion of the first polarizer layer, a portion of the second polarizer layer and one of the plurality of filter segments;
    wherein each optical channel of the plurality of optical channels is activated independently from other optical channels of the plurality of optical channels by applying a first voltage between the first transparent electrode layer and the electrode segment of the second transparent electrode layer of a respective optical channel; and
    wherein each optical channel of the plurality of optical channels is deactivated independently from the other optical channels of the plurality of optical channels by applying a second voltage between the first transparent electrode layer and the electrode segment of the second transparent electrode layer of the respective optical channel.

2. The photoacoustic spectrometry device according to the claim 1, wherein the first transparent electrode layer comprises a glass layer having a conductive coating.

3. The photoacoustic spectrometry device according to claim 1, wherein the second transparent electrode layer comprises a glass layer having a conductive coating, wherein the conductive coating is structured in order to form the plurality of electrode segments of the second transparent electrode layer.

4. The photoacoustic spectrometry device according to claim 1, wherein the filter layer is arranged at an end of the stacked optical filter arrangement.

5. The photoacoustic spectrometry device according to claim 1, wherein within each optical channel of the plurality of optical channels a polarizing axis of the portion of the first polarizer layer of the respective optical channel is orientated perpendicular to a polarizing axis of the portion of the second polarizer layer of the respective optical channel.

6. The photoacoustic spectrometry device according to claim 1, wherein within each optical channel of the plurality of optical channels a polarizing axis of the portion of the first polarizer layer of the respective optical channel is orientated parallel to a polarizing axis of the portion of the second polarizer layer of the respective optical channel.

7. The photoacoustic spectrometry device according to claim 1, wherein the stacked optical filter arrangement comprises a collimation arrangement for parallelizing the light, wherein each optical channel of the plurality of optical channels comprises a portion of the collimation arrangement.

8. The photoacoustic spectrometry device according to claim 7, wherein the collimation arrangement comprises a Fresnel lens.

9. The photoacoustic spectrometry device according to claim 1, wherein at least one of the filter segments is a wavelength insensitive filter segment, which is transparent at least for wavelengths between 3 µm and 5 µm.

10. The photoacoustic spectrometry device according to claim 1, wherein the radiator is arranged on a first side of a filter layer of the stacked optical filter arrangement, and wherein a first polarizer layer and a second polarizer are arranged on a second side of the filter layer of the stacked optical filter arrangement.

11. The photoacoustic spectrometry device according to claim 1, wherein the radiator is configured for emitting a continuous spectrum comprising at least wavelengths between 3 µm and 5 µm.

12. The photoacoustic spectrometry device according to claim 1, wherein the control device is configured for controlling a measuring procedure, in which at a same time interval:
    one optical channel of a plurality of optical channels, which comprises one of a plurality of wavelength sensitive filter segments, is alternately activated or deactivated at a switching frequency by alternately applying a first voltage or a second voltage between a first transparent electrode layer and an electrode segment of a second transparent electrode layer of the respective optical channel;

all other optical channels of the plurality of optical channels, which comprise a wavelength insensitive filter segment or one of the wavelength sensitive filter segments being transparent for a different wavelength than the wavelength sensitive filter segment of the one optical channel, are deactivated by applying the second voltage between the first transparent electrode layer and the electrode segment of the second transparent electrode layer of the respective optical channels; and the sound in the gas detection chamber is detected by using the microphone.

13. The photoacoustic spectrometry device according to claim 12, wherein the control device is configured for controlling a calibrating procedure, in which at a same further time interval:

one optical channel of the plurality of optical channels, which comprises the wavelength insensitive filter segment, is alternately activated or deactivated at the switching frequency by alternately applying the first voltage or the second voltage between the first transparent electrode layer and the electrode segment of the second transparent electrode layer of the respective optical channel;

all other optical channels of the plurality of optical channels, which comprise a wavelength sensitive filter segment, are deactivated by applying the second voltage between the first transparent electrode layer and the electrode segment of the second transparent electrode layer of the respective optical channels; and the sound in the gas detection chamber is detected by using the microphone in order to estimate a decay of the radiator by measuring a strength of the sound.

14. The photoacoustic spectrometry device according to claim 12, wherein the switching frequency is in a range from 100 kHz to 300 kHz.

15. The photoacoustic spectrometry device according to claim 12, wherein a distance between the first transparent electrode layer and the second transparent electrode layer is smaller than a maximum distance between the first transparent electrode layer and the second transparent electrode layer, wherein the maximum distance is calculated according to a numerical value equation $d_{max}=T \times U$, wherein $d_{max}$ is the maximum distance in μm, wherein T is a time of oscillation of the switching frequency in μs and wherein U is an absolute value of a difference between the first voltage and the second voltage in V.

16. A method of manufacturing a photoacoustic spectrometry device for multi-gas sensing, the method comprising:

configuring a radiator for emitting light, which is coherent;

configuring a stacked optical filter arrangement for receiving and filtering the light from the radiator in order to produce filtered light;

configuring a gas detection chamber for exposing a mixture of gases to the filtered light;

configuring a microphone for detecting sound in the gas detection chamber, which is caused by exposing the mixture of gases to the filtered light; and configuring a control device for controlling the photoacoustic spectrometry device, wherein configuring the stacked optical filter arrangement further comprises:

arranging a pneumatic liquid crystal layer between a first transparent electrode layer and a second transparent electrode layer, wherein the second transparent electrode layer comprises a plurality of electrode segments which are electrically isolated from each other;

arranging the pneumatic liquid crystal layer between a first polarizer layer and a second polarizer layer;

adding a filter layer being configured for filtering light, wherein the filter layer comprises a plurality of filter segments, wherein at least two of the filter segments are wavelength sensitive filter segments, wherein the at least two of the wavelength sensitive filter segments are transparent for different wavelengths; and forming a plurality of optical channels;

so that each optical channel of the plurality of optical channels comprises a portion of the pneumatic liquid crystal layer, a portion of the first transparent electrode layer, one of the plurality of electrode segments of the second transparent electrode layer, a portion of the first polarizer layer, a portion of the second polarizer layer and one of the plurality of filter segments;

so that each optical channel of the plurality of optical channels is activated independently from other optical channels of the plurality of optical channels by applying a first voltage between the first transparent electrode layer and the electrode segment of the second transparent electrode layer of a respective optical channel; and so that each optical channel of the plurality of optical channels is deactivated independently from the other optical channels of the plurality of optical channels by applying a second voltage between the first transparent electrode layer and the electrode segment of the second transparent electrode layer of the respective optical channel.

* * * * *